US006791090B2

(12) United States Patent
Lin et al.

(10) Patent No.: US 6,791,090 B2
(45) Date of Patent: Sep. 14, 2004

(54) COMPTON DECONVOLUTION CAMERA

(75) Inventors: Gregory Sharat Lin, Fremont, CA (US); Stuart J. Swerdloff, Mountain View, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 247 days.

(21) Appl. No.: 09/846,423

(22) Filed: Apr. 30, 2001

(65) Prior Publication Data

US 2002/0011571 A1 Jan. 31, 2002

Related U.S. Application Data

(60) Provisional application No. 60/205,796, filed on May 17, 2000.

(51) Int. Cl.[7] .................................................. G01T 1/20
(52) U.S. Cl. ...................... 250/367; 250/367; 250/336.1
(58) Field of Search ................................. 250/367, 369, 250/336.1, 363.1, 370.1, 366; 378/89

(56) References Cited

U.S. PATENT DOCUMENTS

| 3,699,340 A | 10/1972 | Hick et al. |
|---|---|---|
| 4,529,882 A | 7/1985 | Lee |
| 5,175,434 A | 12/1992 | Engdahl |
| 5,528,650 A | 6/1996 | Swerdloff et al. |
| 5,567,944 A | 10/1996 | Rohe et al. |
| 5,821,541 A | * 10/1998 | Tumer .................... 250/370.09 |
| 5,841,141 A | 11/1998 | Gullberg et al. |
| 5,861,627 A | 1/1999 | Basko et al. |
| 6,057,551 A | 5/2000 | Tararine |

OTHER PUBLICATIONS

Cree et al, "Towards Direct Reconstruction from a Gamma Camera Based on Compton Scattering," Jun. 1994, IEEE Transactions on Medical Imaging, vol. 13, pp. 398–407.*

Michael J. Cree, et al., "Towards Direct Reconstruction From a Gamma Camera Based on Compton Scattering", IEEE Transaction on Medical Imaging, vol. 13, No. 2, Jun., 1994, pp. 398–407.

C. Hua, et al., "Comparisons of Predicted Lesion Detection Performance for Compton Cameras and Parallel–Hole Collimated Cameras", The Journal of Nuclear Medicine, vol. 40, No. 5, May, 1999 (Supplement), p. 33, No. 133.

B.E. Patt, et al., "Solid State Anger Camera", The Journal of Nuclear Medicine, vol. 40, No. 5, May, 1999 (Supplement), p. 149, No. 599.

N. Hartsough, et al., "Performance Characteristics of a Compact, Quantized Gamma Camera", The Journal of Nuclear Medicine, vol. 40, No. 5, May, 1999 (Supplement), p. 277, No. 1225.

(List continued on next page.)

Primary Examiner—David Porta
Assistant Examiner—Christine Sung

(57) ABSTRACT

A Compton Deconvolution Camera (CDC) comprises multiple detection layers, position sensing logic to determine positions of events in each detection layer, a coincidence detector to detect pairs of coincident events resulting from Compton scattering, and processing logic. For each of multiple subsets of one of the detection layers, the processing logic associates data representing detected events with a distribution of corresponding events in another detection layer. The processing logic applies a deconvolution function to localize probable source locations of incident photons, computes probable Compton scattering angles for event pairs, and uses the probable source locations to reconstruct an image. Each of the detection layers may comprise an array of solid-state ionization detectors, or a scintillator and an array of solid-state photodetectors. A hybrid detector may include one layer comprising an array of solid-state ionization detectors and another layer comprising a scintillator and an array of solid-state or photomultiplier photodetectors.

72 Claims, 20 Drawing Sheets

OTHER PUBLICATIONS

T.R. Mackie, et al., "Tomotherapy: A New Concept for the Delivery of Dynamic Conformal Radiotherapy", Medical Physics, vol. 20, No. 6, Nov./Dec. 1993, pp. 1709–1719.

T. Holmes, et al., "A Unified Approach to the Optimization of Brachytherapy and External Beam Dosimetry", International Journal of Radiation Oncology Biology–Physics, vol. 20, No. 4, Apr. 1991, pp. 859–873.

N. Papanikolaou, et al., "Investigation of the Convolution Method for Polyenergetic Spectra", Medical Physics, vol. 20, No. 5, Sep./Oct., 1993, pp. 1327–1336.

Manbir Singh and David Doria, "Single Photon Imaging With Electronic Collimation," IEEE Transactions on Nuclear Science, vol. NS–32, No. 1, Feb. 1985, pp. 843–847.

* cited by examiner

COMPTON DECONVOLUTION CAMERA

This application claims the benefit under 35 U.S.C. § 119(e) of U.S. Provisional Patent application No. 60/205,796, filed on May 17, 2000, and entitled, "Compton Deconvolution Camera".

FIELD OF THE INVENTION

The present invention pertains to medical imaging systems. More particularly, the present invention relates to a method and apparatus for generating images in a medical imaging system based on detected radiation by applying Compton scattering and deconvolution principles.

BACKGROUND OF THE INVENTION

In nuclear medicine, images of internal structures or functions of a patient's body are acquired by using one or more gamma camera detector heads to detect radiation emitted by a radiopharmaceutical that has been injected into the body. A computer system controls the gamma camera detector heads to acquire data and then processes the acquired data to generate images. Nuclear medicine imaging techniques include single photon emission computed tomography (SPECT) and positron emission tomography (PET). SPECT imaging is based on the detection of individual gamma rays emitted from the body, while PET imaging is based on the detection of gamma ray pairs resulting from electron-positron annihilations and emitted in coincidence with each other.

Existing gamma cameras commonly utilize a heavy lead collimator, a planar scintillation crystal, and a coarse array of bulky photomultiplier tubes (PMTs). The collimator absorbs all incident gamma photons except those traveling in a specific direction at each cell in the collimator in order to reconstruct a meaningful two-dimensional planar image. Collimators with different acceptance geometries are available, but must be physically exchanged with a cumbersome transport mechanism capable of supporting their substantial weight.

A collimator drastically reduces the counting efficiency of the gamma camera. It adds great weight to the camera detector heads which, in turn, must be supported by a very heavy gantry. Exchanging collimators requires time and labor, thereby reducing patient throughput. The bulky exchange mechanism occupies a sizeable space and is subject to mechanical misalignment, thereby requiring service calls.

PMTs are an old technology that has not fundamentally changed in decades. PMTs are not only bulky, but also consume energy, generate heat, and require replacement when their efficiency decays or when they fail.

SUMMARY OF THE INVENTION

The present invention includes a Compton deconvolution camera that comprises at least two detection layers, each to detect events resulting from incident photons. The camera further includes position sensing logic to determine positions of events in each of the detection layers, a coincidence detector to detect pairs of coincident events resulting from Compton scattering, and processing logic. For each of a plurality of subsets of one of the detection layers, the processing logic associates data representing detected events with a distribution of corresponding events in the other detection layer, based on the detected pairs of coincident events. The processing logic then uses a deconvolution function to localize probable source locations of incident photons, and then uses the probable source locations to reconstruct an image of an object.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
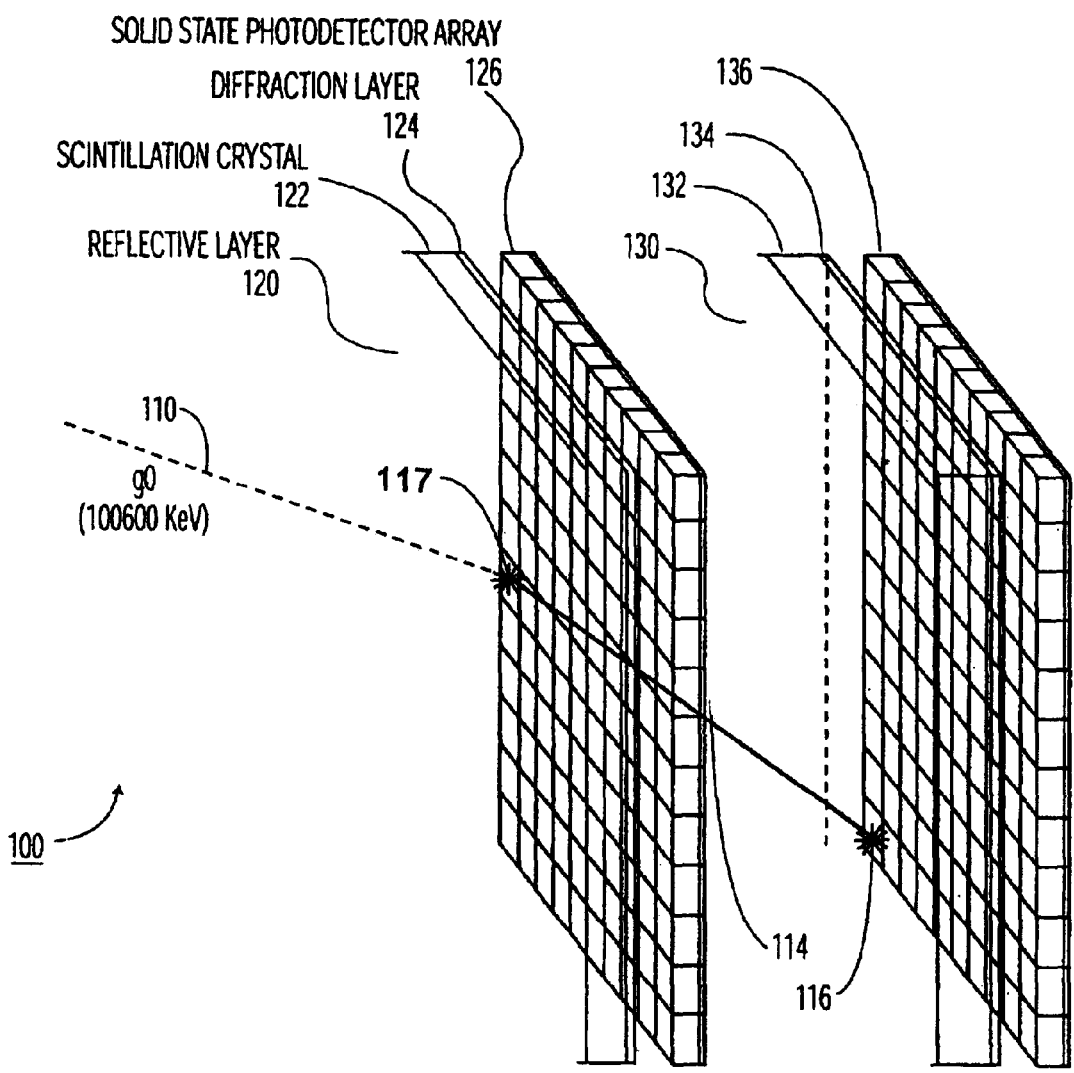
FIG. 1A illustrates a biplane scintillation camera with arrays of solid-state wafer photodetectors.

A method and apparatus for generating images in a medical imaging system based on detected radiation by using Compton scattering principles are described. An embodiment of the apparatus is referred to herein as the Compton Deconvolution Camera (CDC). Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

The CDC allows imaging of the spatial distribution of radioactive sources (e.g., the biodistribution of radiopharmaceuticals) without a physical collimator. By "physical" collimator, what is meant is a piece of equipment that absorbs photons not traveling in a specific direction to prevent them from reaching a detector, an example of which is a conventional lead collimator. Although described in greater detail below, the CDC may be briefly summarized as follows. A biplane-detector solid-state gamma camera head determines the angular origin of each incoming gamma photon by coincident events (scintillation or ionization) in two parallel detector planes. Spatial localization is achieved by deconvolution of a large number of such coincident events. Thus, incident gamma photons are accepted from a wide and variable field-of-view instead of through a collimator.

Each detection layer includes either solid-state ionization detectors or a scintillation crystal plane with solid-state photodetectors. Alternatively, the second layer (i.e., the layer farthest from the object to be imaged) may instead have photomultiplier tubes (PMTs). The first layer (the layer closest to the object to be imaged) is optimized to increase the probability of occurrence of a single Compton scattering. The second layer is designed to maximize the probability of absorption of all residual energy in the scattered gamma photon for accurate determination of photon energy.

Most image reconstruction can be done in software from coincident counts collected in the two detection layers. As a result, many imaging parameters can be adjusted in post-processing—including collimation (if desired: parallel, convergent, divergent), steering, angle of acceptance, coincidence filtering, and/or focusing—providing enormous flexibility in image reconstruction and image reprocessing.

By using two detection planes, the angular origin of each incident gamma photon can be determined, eliminating the need for a collimator. The use of solid-state devices is independent of the collimator, but provides a way of eliminating inhomogeneous electron densities (such as metal electrodes in PMTs) that may otherwise scatter photons in between the two detection layers.

The use of solid-state devices offers many new opportunities, including higher resolution and improved photon spectrometry. Solid-state detector arrays available today offer practical alternatives to PMTs while providing improved energy resolution.

The combination of no physical collimator, two detection layers, and solid-state devices offers simultaneous additional opportunities for unprecedented flexibility in image reconstruction, increasing sensitivity, reducing size and weight, improving patient throughput, and reducing mechanical cost.

In one embodiment, the CDC includes two parallel detection layers, circuitry and algorithms to localize ionization or scintillation events in each detection layer and estimate the amount of energy deposited by an incident gamma photon, algorithms to compute the cone of origin of a Compton-scattered gamma photon, a deconvolution processor to localize the probable origin of each such gamma photon, and a device to visually display the reconstructed image. A nuclear medicine imaging system may contain one or more CDC detector heads, each including two detection layers and associated circuitry as described above, which may be rotated about a patient by a gantry to acquire data for tomographic imaging.

The purpose of the two parallel detection layers is to not only detect an incident gamma photon and localize its position of incidence, but to determine from which direction the photon is coming. The first layer is designed to produce a high probability of detecting a single Compton scattering event, and the second layer is designed to produce a high probability of absorbing the residual energy of gamma photons scattered from the first layer. In general, this is done by making the first layer thinner and less electron-dense, and by making the second layer thicker and more electron-dense.

Figure 1B:
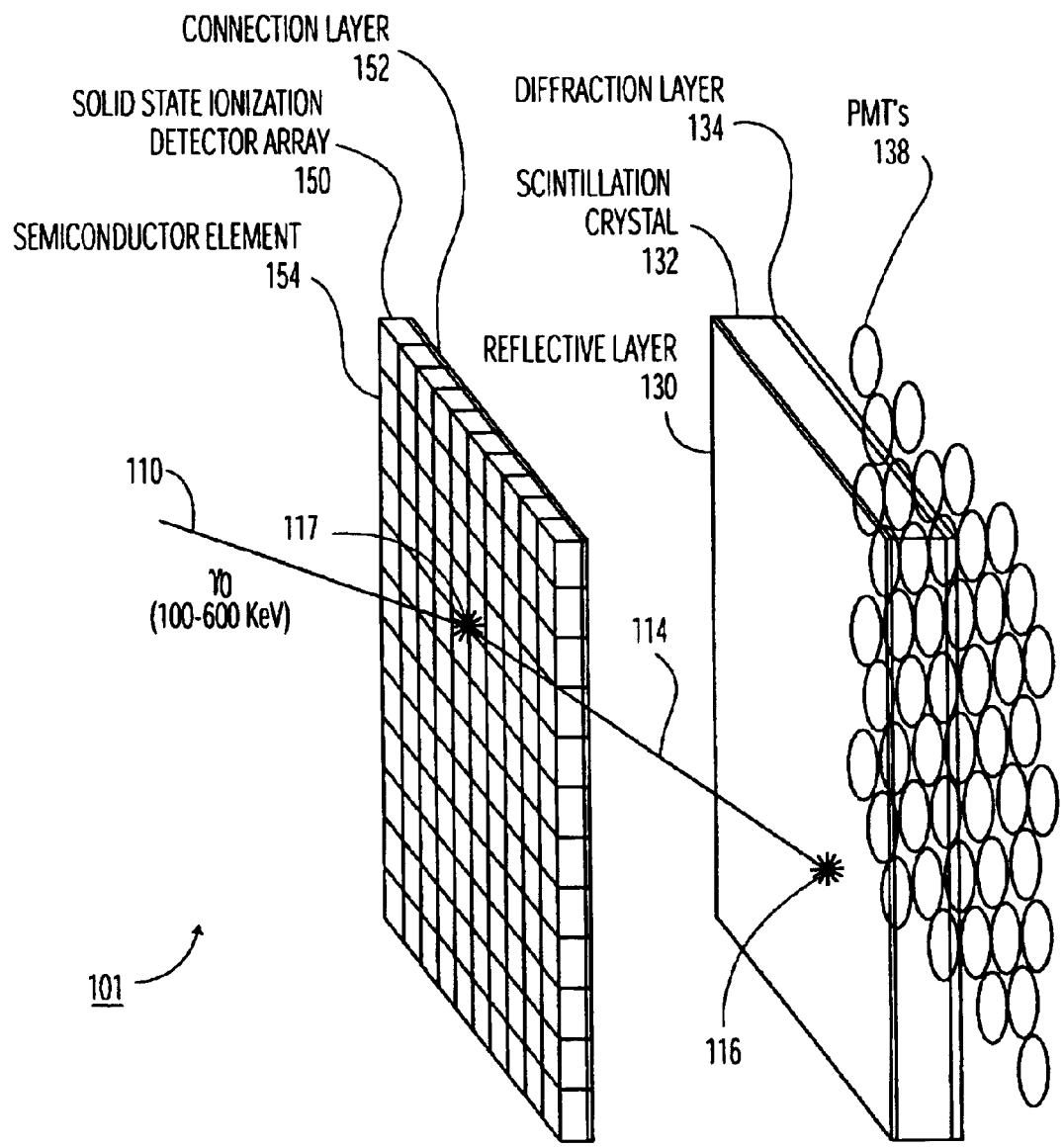
FIG. 1B illustrates a hybrid biplane camera with a first solid-state ionization detection layer and a second scintillation layer with PMTs.
Figure 1C:
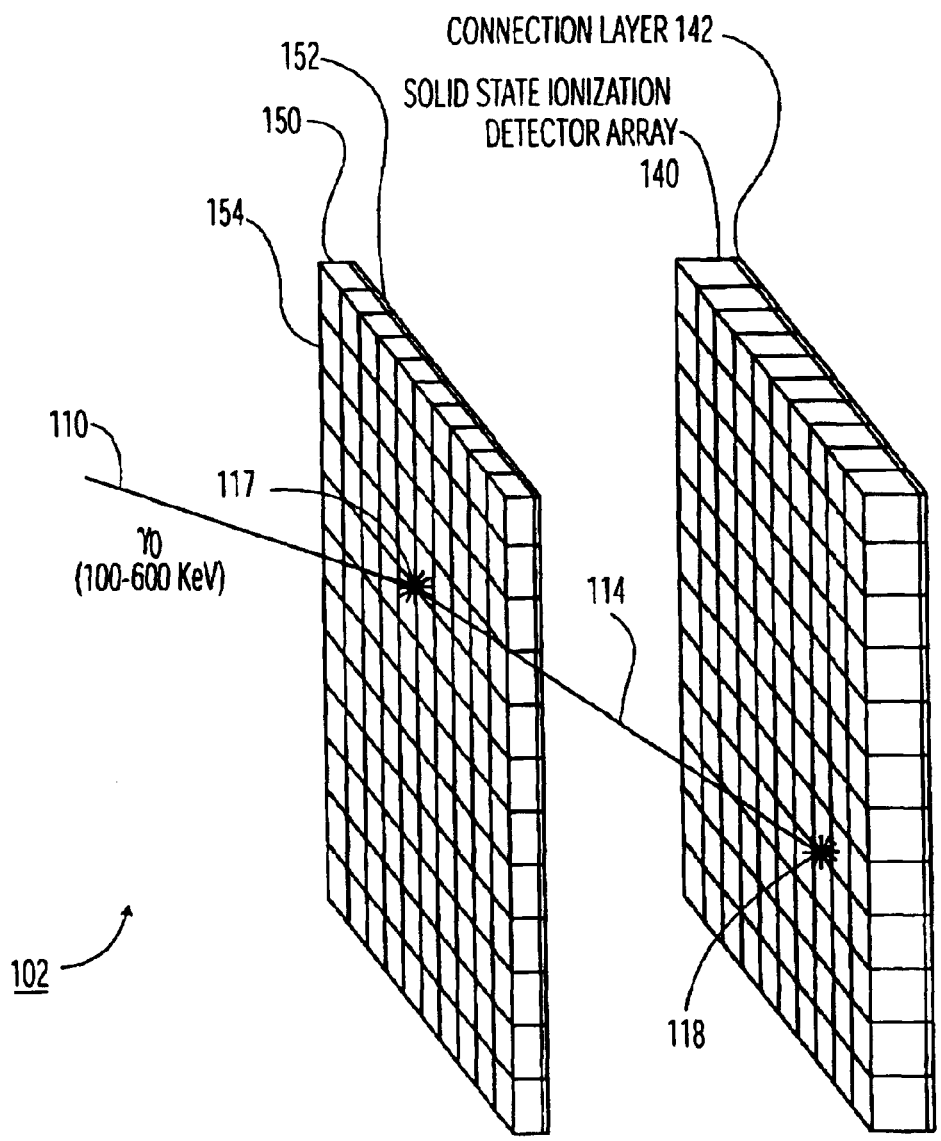
FIG. 1C illustrates a biplane solid-state ionization detector.
Figure 3A:
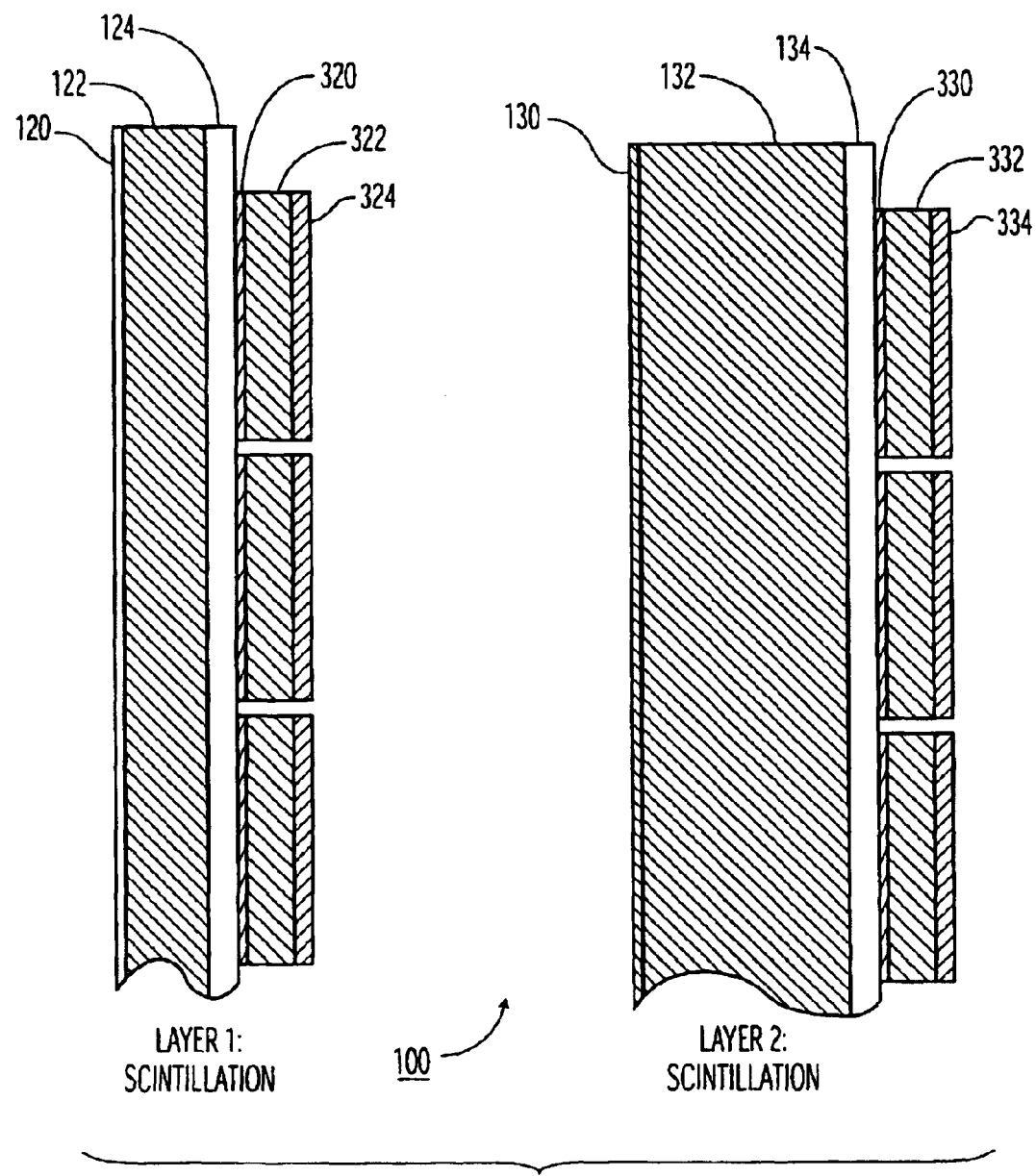
FIG. 3A is a side view of a biplane scintillation camera with arrays of solid-state wafer photodetectors.
Figure 3B:
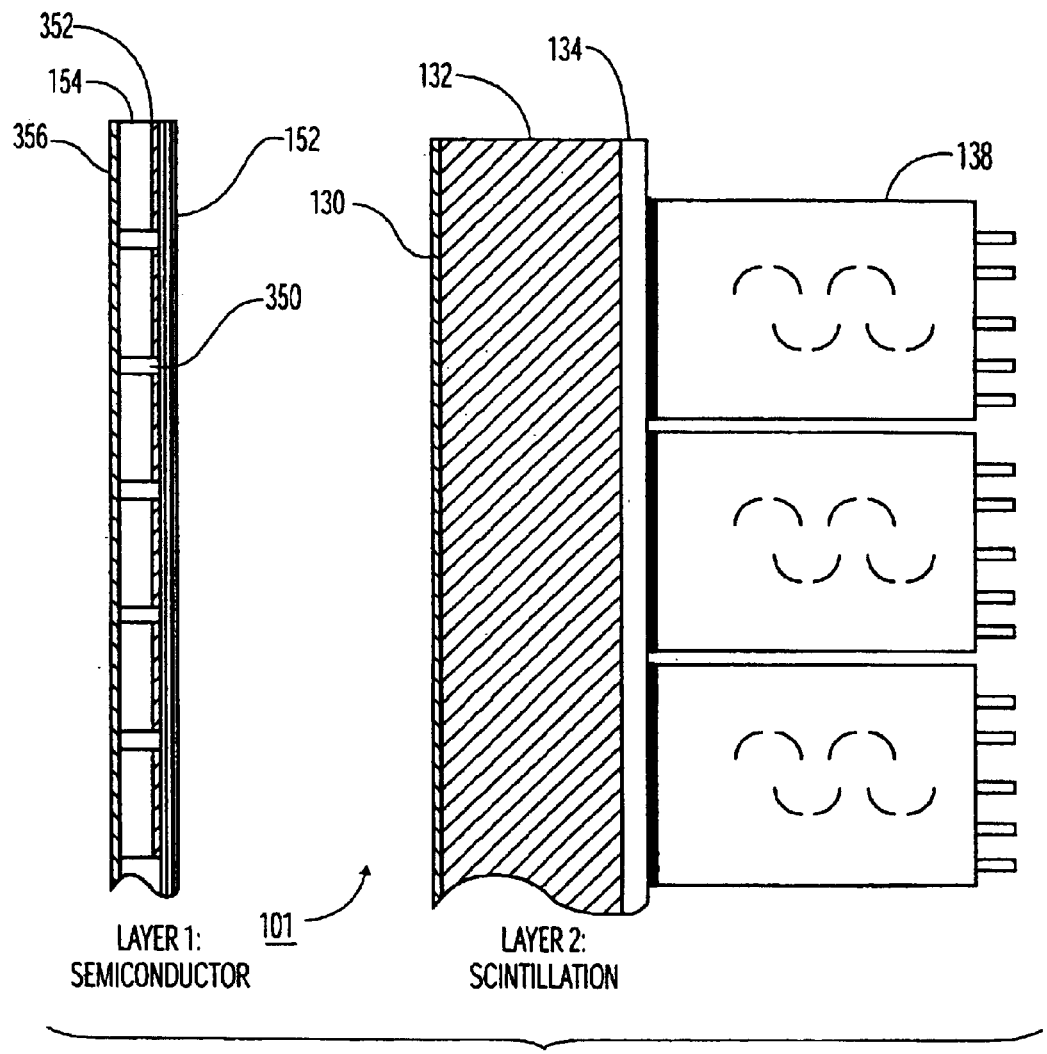
FIG. 3B is a side view of a hybrid biplane camera with a first solid-state ionization detection layer and a second scintillation layer with PMTs.
Figure 3C:
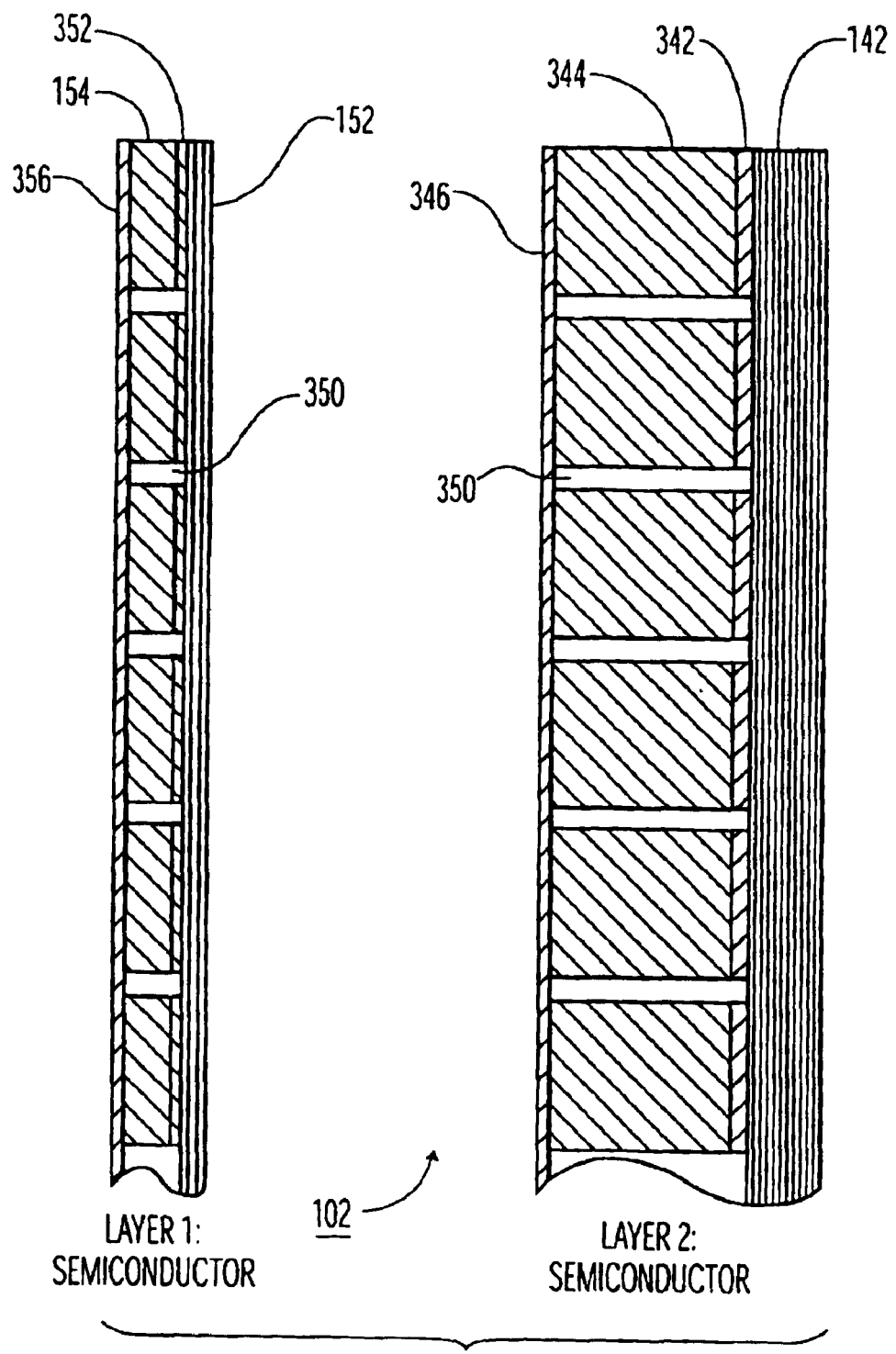
FIG. 3C is a side view of a biplane solid-state ionization detector.

Three possible embodiments of the double-layer detector include: 1) two parallel scintillation layers, each with an array of solid-state photodetectors, as shown in FIGS. 1A and 3A; 2) two parallel two-dimensional arrays of solid-state ionization detectors, as shown in FIGS. 1C and 3C; and 3) a hybrid camera which has a first semiconductor ionization detector and a second scintillation layer with an array of photodetectors, e.g. PMTs, as shown in FIGS. 1B and 3B. In the Figures, similar elements in different versions of the invention appearing in the various Figures have the same element numbers. Thus, FIG. 1A illustrates a biplane scintillation camera head 100 comprising two detector layers including arrays 126 and 136 of solid-state wafer photodetectors. As shown in FIG. 1A, coupled to the photodetector arrays 126 and 136 are, respectively, diffraction layers 124 and 134, scintillation crystals 122 and 132, and reflective layers 120 and 130. A gamma photon 110 is also shown, which causes a Compton scintillation event 117 in the first scintillation layer 122, which is scattered along path 114 to result in a total absorption scintillation event 116 in the second scintillation layer 132. FIG. 3A shows a side view of the detector head 100. Visible in this view are the anterior electrical connection layers 320 and 330 and the posterior electrical connection layers 324 and 334 for the solid-state photodetector elements 322 and 332, respectively.

FIG. 1B illustrates a hybrid biplane camera head 101 with a first solid-state ionization detection layer and a second scintillation layer with PMTs. In FIG. 1B, the first detector layer includes a solid-state ionization detector array 150 including a number of semiconductor ionization detector elements 154 and a posterior electrical connection layer 152. The second layer includes a scintillation crystal 132 optically coupled to an array of PMTs 138 via diffraction layer 134, and optically coupled to a reflective layer 130. A gamma photon 110 is also shown, which causes a Compton ionization event 117 in the first detector layer 150, followed by a total absorption scintillation event 116 in the second detector layer 132. FIG. 3B shows a side view of the detector head 101. Visible in this view are the posterior electrical contacts 352 for the individual ionization detector elements 154, separated by spaces 350, as well as the anterior electrical connection layer 356 for the first detector layer.

FIG. 1C illustrates a biplane solid-state ionization detector. In this embodiment, the first detection layer is the same as in FIGS. 1B and 3B. However, the second detection layer includes a solid-state ionization detector array 140 and a posterior electrical connection layer 142. A gamma photon 110 is also shown, which causes a Compton ionization event 117 in the first detector layer 150, followed by an ionization event 118. FIG. 3C shows a side view of the detector head 102. Visible in this view are the posterior electrical contacts 342 for the individual ionization detector elements 344 of the second detection layer, separated by spaces 350, as well as the anterior electrical connection layer 346 for the first detector layer.

Figure 2:
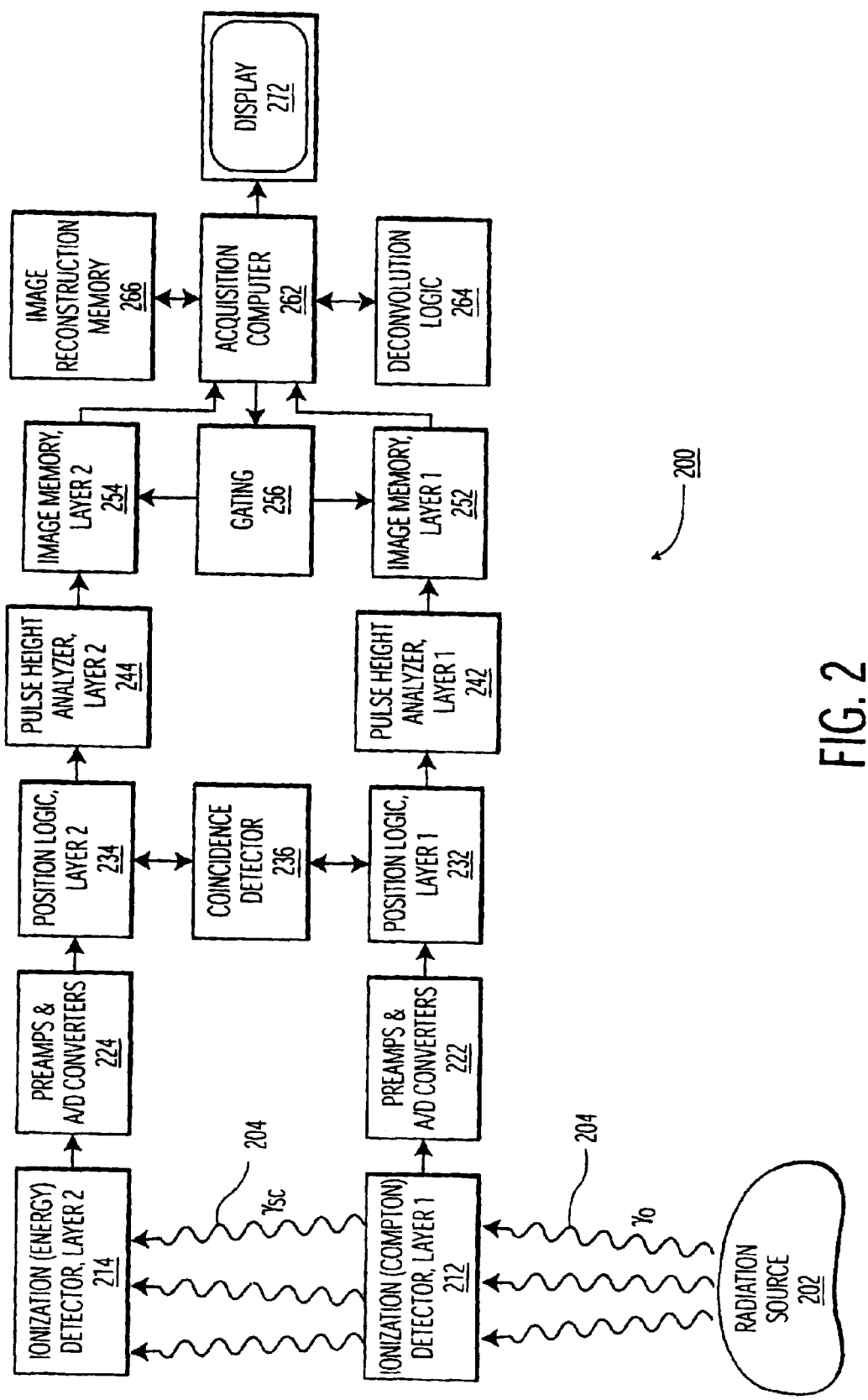
FIG. 2 is a block diagram of a biplane coincidence gamma camera.

FIG. 2 is a block diagram of a CDC system 200 according to one embodiment. As shown, the CDC system includes two detection layers 212 and 214. The CDC system further includes (associated with the first detection layer 212) preamplification and analog-to-digital (A/D) conversion circuitry 222, position sensing logic 232, pulse height analyzer 242, and image memory 252. In addition, the CDC system includes (associated with the second detection layer 214) pre-amplification and A/D conversion circuitry 224, position sensing logic 234, pulse height analyzer 244, and image memory 254. A coincidence detector 236 is coupled to position sensing logic 232 and position sensing logic 234. Gating unit 256 is coupled to image memories 264 and 266 to facilitate dynamic cardiac and breathing scans. The acquisition computer 262 processes the data stored in memories 252 and 254 to reconstruct images of the radiation source 202. The acquisition computer 262 may also control various other functions of the CDC system, including movement of the gantry (not shown) to rotate the detector heads around the patient. Deconvolution logic 264 is used to deconvolve data stored in image memory 254 (for the second detector) for each pixel of memory 252, to localize probable source locations of incident photons 204. Reconstructed images are stored in image reconstruction memory 266 and displayed on display device 272.

In a typical embodiment, at least the detection layers 212 and 214 are implemented within a CDC camera "detector head" (not shown). The acquisition computer 262, deconvolution logic 264, and image reconstruction memory 266 are implemented within a conventional computer system, which may be a personal computer (PC) or a workstation, for example. The other components in FIG. 2 may be distributed in essentially any manner between the detector head and the aforementioned computer system, or they may be implemented in one or more physically separate modules (while maintaining the described functional "connections").

Note that many of the elements shown in FIG. 2 may be embodied in either hardware or in software, or in a combination of hardware and software, unless otherwise stated herein, and except as will be recognized by those skilled in the relevant art.

Figure 5:
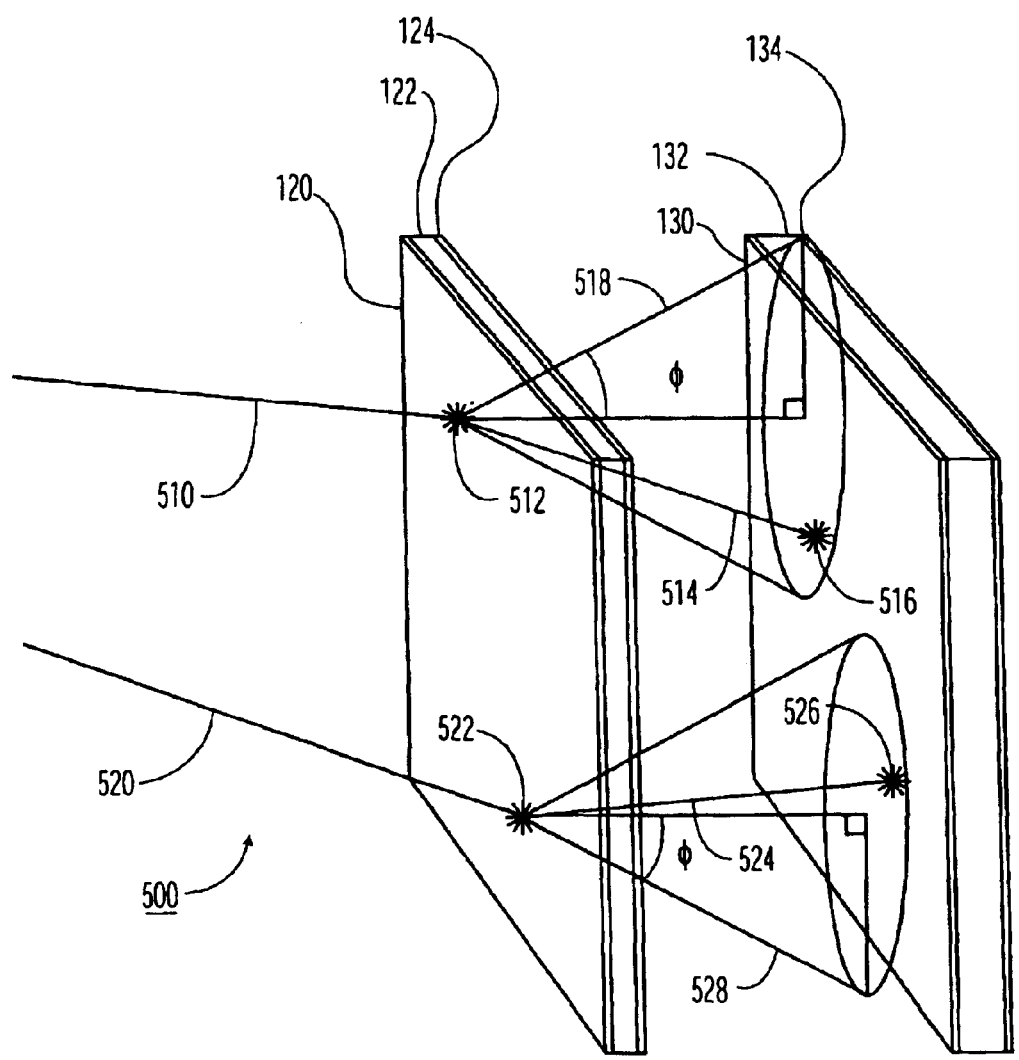
FIG. 5 illustrates a method of detecting multiple coincident events simultaneously by limiting the definition of coincidence to be within cones-of-acceptance.
Figure 8:
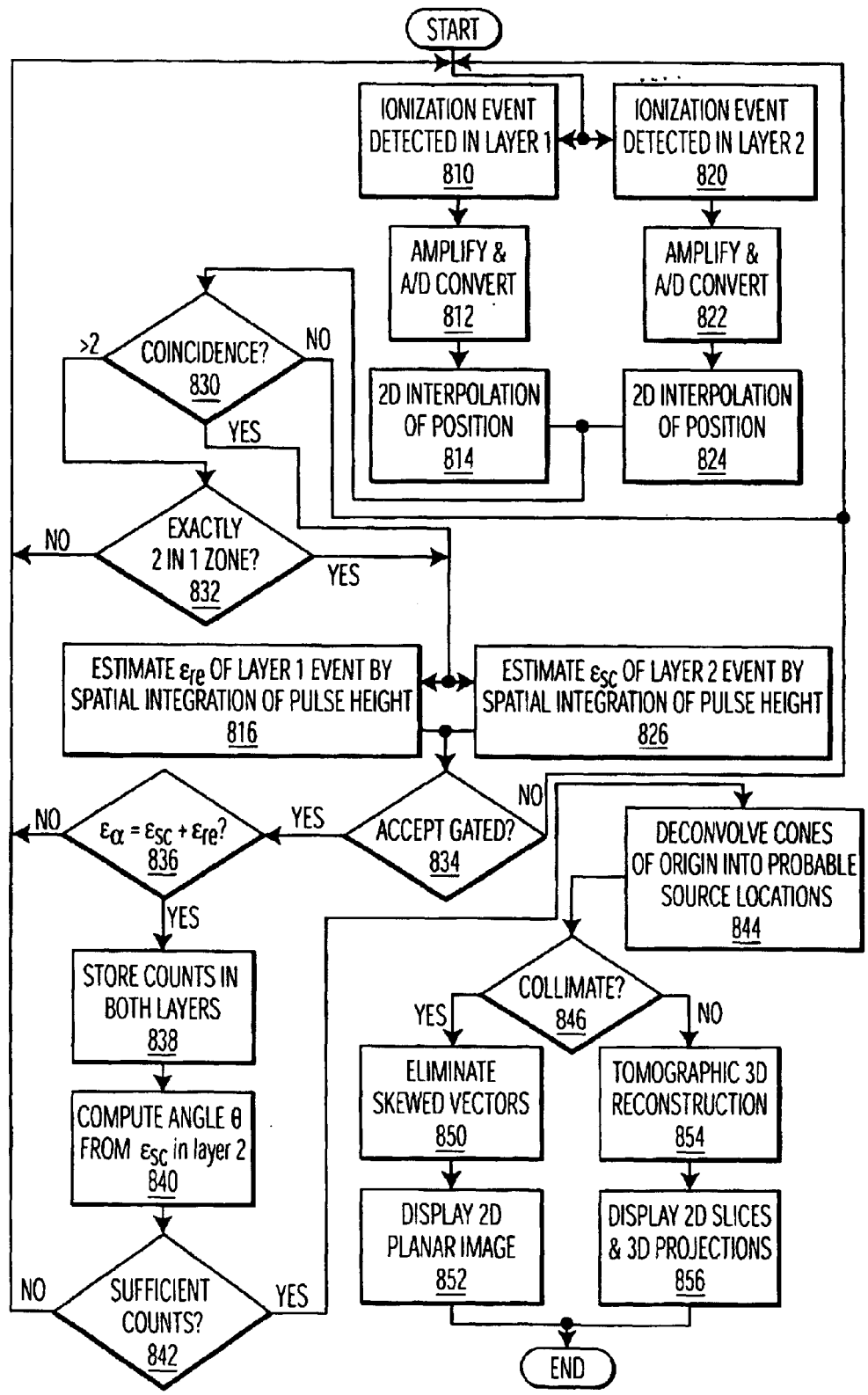
FIG. 8 is a flowchart of the operations in performing event detection and image reconstruction using the Compton Deconvolution Camera (CDC)

Hence, the weak signals of the solid-state detectors 212 and 214 are individually preamplified and A/D converted in the camera head. The channels from each detection layer are connected to position logic 232 or 234 (as appropriate), which performs two-dimensional interpolation of each ionization or scintillation event to estimate the center of its scintillation or ionization distribution within each detection layer, as shown in FIGS. 2 and 8. A coincidence detector (e.g., an AND gate) determines whether each ionization event has a twin that occurred in the other detection layer within a specified time (typically from 0.5 to 1 nanoseconds, depending on the separation between the two detection layers). Non-coincident events are discarded. Coincident events may also be screened on the basis of lateral proximity to accept only a certain range of probable acceptance/scattering angles or to eliminate unrelated coincident events, as shown in FIG. 5. FIG. 5 illustrates a detector head 500 for detection of multiple coincident events simultaneously at locations 512 and 522 by limiting the definition of coincidence to be within cones of acceptance of coincident events. The incident paths 510 and 520 are shown, as are the paths 514 and 524 of the Compton-scattered photons, which are absorbed in the second detection layer at points 516 and 526 respectively. These paths lie within the respective non-overlapping cones of acceptance 518 and 528 of coincident events, and hence, unambiguously define two simultaneous coincident events.

Figure 4A:
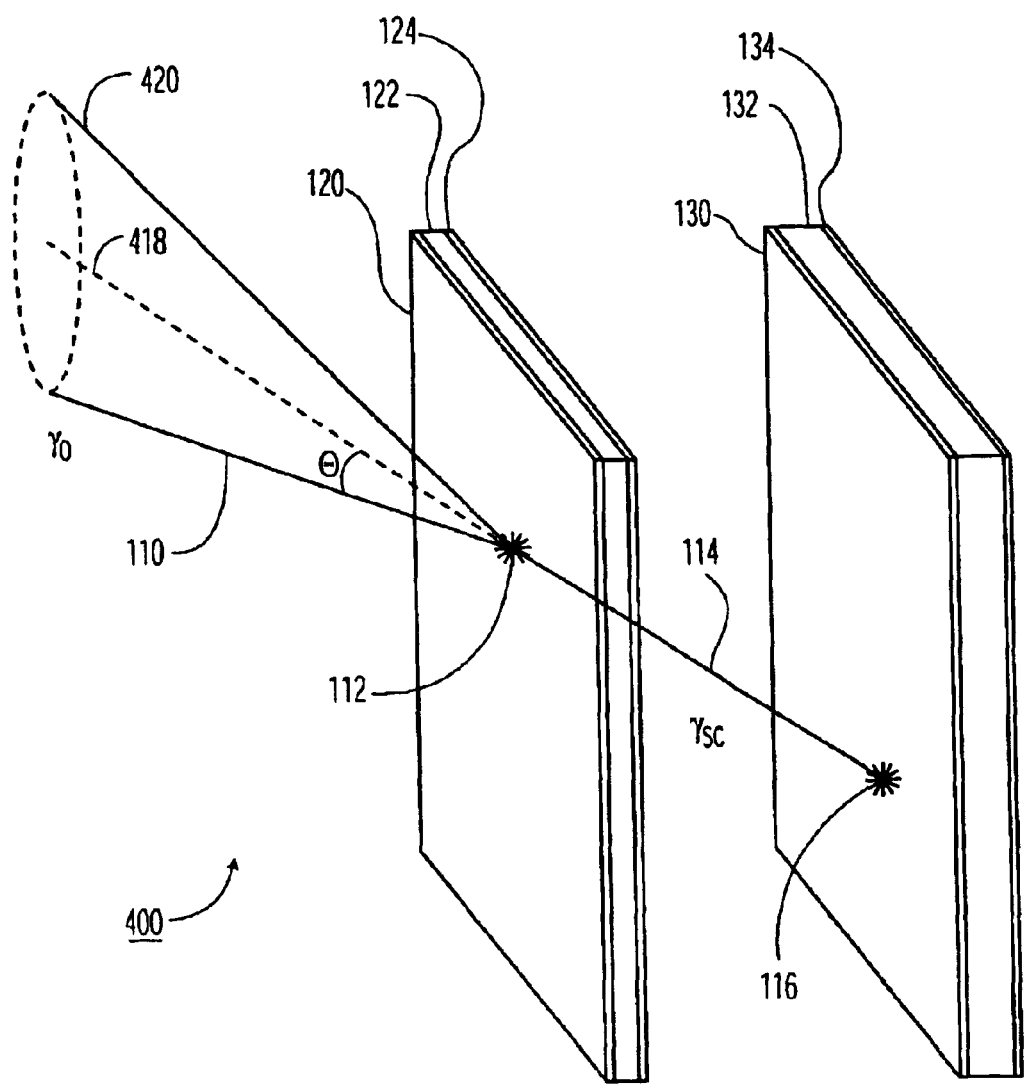
FIG. 4A illustrates coincidence detection of a single incident photon through a Compton scattering event in the first detection layer and an absorption event in the second detection layer, showing also the probability cone of origin.

The energy absorbed in each ionization event is estimated by the pulse height analyzers 242 and 244 from spatially-integrated pulse height and known calibration coefficients for scintillation efficiency, ionization signal amplitude, etc. As a validity check on these values, the estimates of absorbed energy in the two detection layers are summed to determine if they match the expected energy of the incident gamma photon from the radionuclide being imaged, as shown in FIG. 4A. In one embodiment, the validity check is performed by the acquisition computer 262. FIG. 4A illustrates a detector head 400 for coincidence detection of a single incident photon through a Compton scattering event at location 112 in the first detection layer 122 and an absorption event at location 116 in the second detection layer 132, showing also the probability cone of origin 420. The cone of origin 420 is defined by the angle θ about the central axis 418 from the location of event 112. If the image acquisition is gated, only coincident events occurring within periodic intervals are taken. The selected events are stored as counts in memories for the respective detection layers. Note that the "memories" for the two detection layers may actually be embodied in a single memory, i.e., in the same physical storage device.

Figure 7:
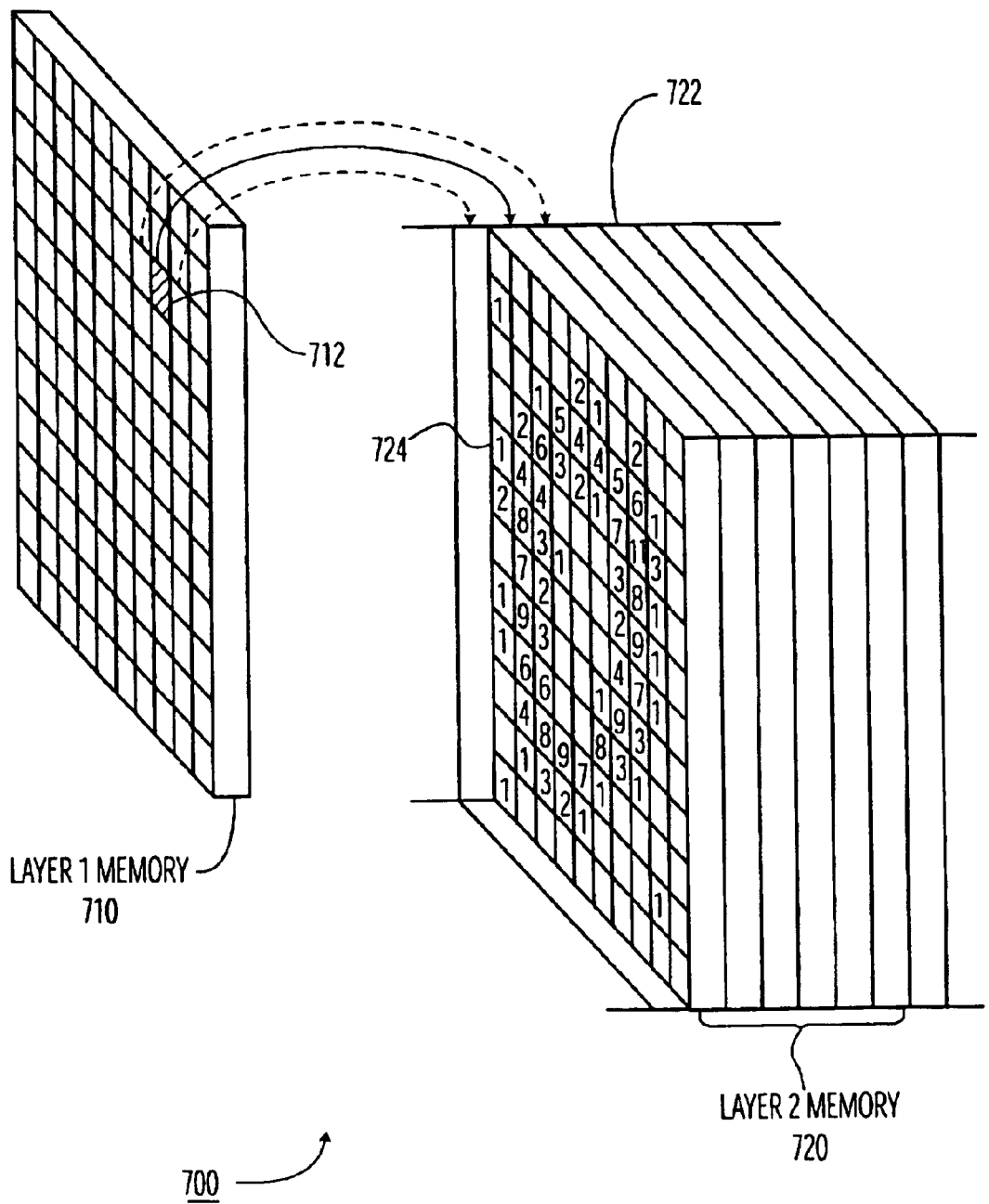
FIG. 7 is a schematic drawing of the arrangement of image memory for associating coincident counts in the second detection layer to counts at each pixel in the first detection layer.

For each coincident event pair of events, the scattering angle is computed, as described below. Considering all counts at a given pixel location in the first detection layer for which there are acceptable coincident counts in the second detection layer, the positional distribution of all such coincident counts in the second layer is accumulated in image memory for each pixel location in the first layer, as shown in FIG. 7. FIG. 7 is a schematic drawing of the arrangement of image memory 700 for associating coincident counts in the second detection layer to counts at each pixel in the first detection layer. Specifically, the image memory 720 for the second detection layer is shown, which includes various planes 722 for forward-projected scattering distributions coincident with events recorded in a particular pixel 712 of image memory 710 of the first detection layer. The numerals inside the various pixels 724 of the second layer image memory 720 indicate an example of the relative number of counts in the second layer corresponding to one pixel 712 in the first layer image memory 710.

After accumulating a large collection of coincident events, a deconvolution is performed on the data associated with the second detection layer for each pixel in the first detection layer to localize the probable origin distribution of the collection of incident gamma photons. Merging the probable origin data for all pixels in the first detection layer further improves the count statistics to improve the signal-to-noise ratio and resolution.

Figure 9A:
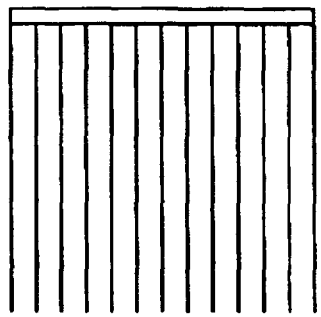
FIGS. 9A through 9F illustrate several image vector formats possible with variable electronic collimation.
Figure 9B:
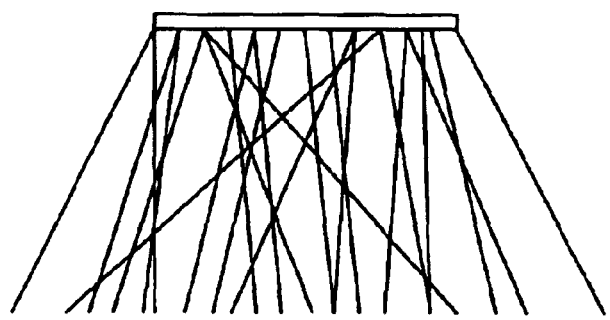
Figure 9C:
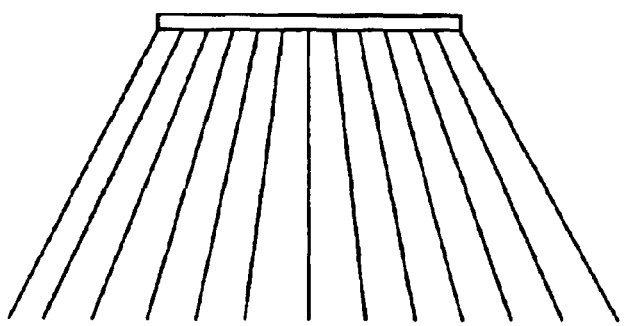
Figure 9D:
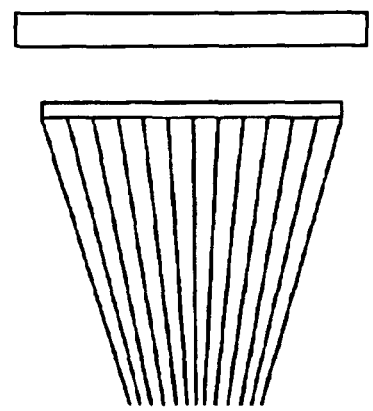
Figure 9E:
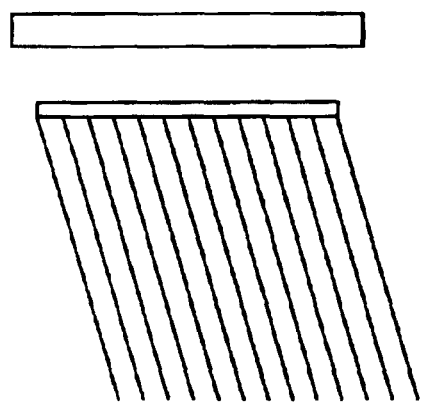
Figure 9F:
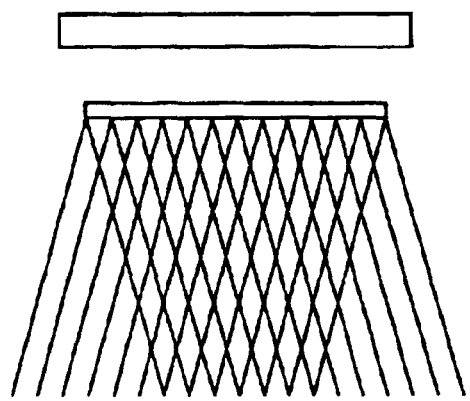

At this point, additional filtering may be performed, which may be implemented in software for example, to achieve collimation, angle of acceptance, steering, focusing, etc., as shown in FIGS. 9A through 9F. FIGS. 9A through 9F illustrate several image vector formats possible with variable electronic collimation, i.e., respectively: parallel rectangular (FIG. 9A), multi-directional within sector (FIG. 9B), divergent sector (FIG. 9C), convergent sector (focused; FIG. 9D), parallel steered (FIG. 9E), and compound parallel steered (FIG. 9F).

Rotating the detector heads (or acquiring data from a ring of CDC detectors) begins the tomographic reconstruction process to further improve estimates of depth in three-dimensional image reconstruction. The result is plotted as counts in either two-dimensional planar projections or three-dimensional volumetric datasets, and displayed to the operator.

The principle of operation of the CDC will now be further described. Radionuclides used in medical radiopharmaceuticals typically emit mono-energetic gamma photons in the energy range of 80 keV to 550 keV. In this range the dominant interactions in matter are photoelectric absorption and Compton scattering. If photoelectric absorption occurs in the first detection layer, there is no coincidence and the gamma photon is simply not counted.

However, if a Compton scattering occurs, the incident gamma photon $\gamma_0$ is scattered by collision with an electron, transferring a portion of its energy to the recoil electron. The trajectory of the scattered photon $\gamma_{sc}$ is at a specific angle $\theta$ relative to that of the incident photon $\gamma_0$, as given by equation (1), where $\epsilon_0$ is the energy of the incident photon, $\epsilon_{sc}$ is the energy of the scattered photon, $m_{re}$ is the rest mass of the recoil electron, and c is the velocity of light.

$$\theta = \cos^{-1}\left[\left(1 - \frac{\varepsilon_o}{\varepsilon_{sc}}\right)\frac{m_{re}c^2}{\varepsilon_o} + 1\right] \quad (1)$$

Thus, given the energies of the incident and scattered photons, the Compton scattering angle can be determined. The energy $\epsilon_{re}$ of the recoil electron, estimated by pulse height analysis in the first detection layer, is also constrained by equation (2):

$$\epsilon_{re} = \epsilon_0 - \epsilon_{sc} \quad (2)$$

Therefore, the energy $\epsilon_{re}$ can be used as used as a validation check that two coincident events are in fact related to the same incident gamma photon. If this validation fails, the coincident events are discarded. This feature is useful in discarding those gamma photons undergoing multiple Compton scattering events within the first detection layer, whose $\theta$ is not well defined.

A coincident event in the two detection layers is accepted when the two events are separated in time by the interval $\tau_2-\tau_1$, as given by equation (3), where $\tau_1$ and $\tau_2$ are the times of ionization events in the first and second detection layers, respectively, $d_{12}$ is the distance between the two detection layers, and $\psi_{sc}$ is the angle of incidence of the scattered photon $\gamma_{sc}$ on the second detection layer:

$$\tau_2-\tau_1=d_{12}/(c \sin \psi_{sc}) \quad (3)$$

For example, for a detection layer separation of 15 cm and a minimum angle of incidence of 60° for the scattered photon $\gamma_{sc}$, the coincidence interval will be ≦0.58 nsec (see FIG. 5). Even if the coincidence interval is taken as 1.0 nsec, a temporal coincidence resolution of 4 nsec is achievable with 1 GHz A/D converters and a 1 GHz coincidence clock.

Figure 4B:
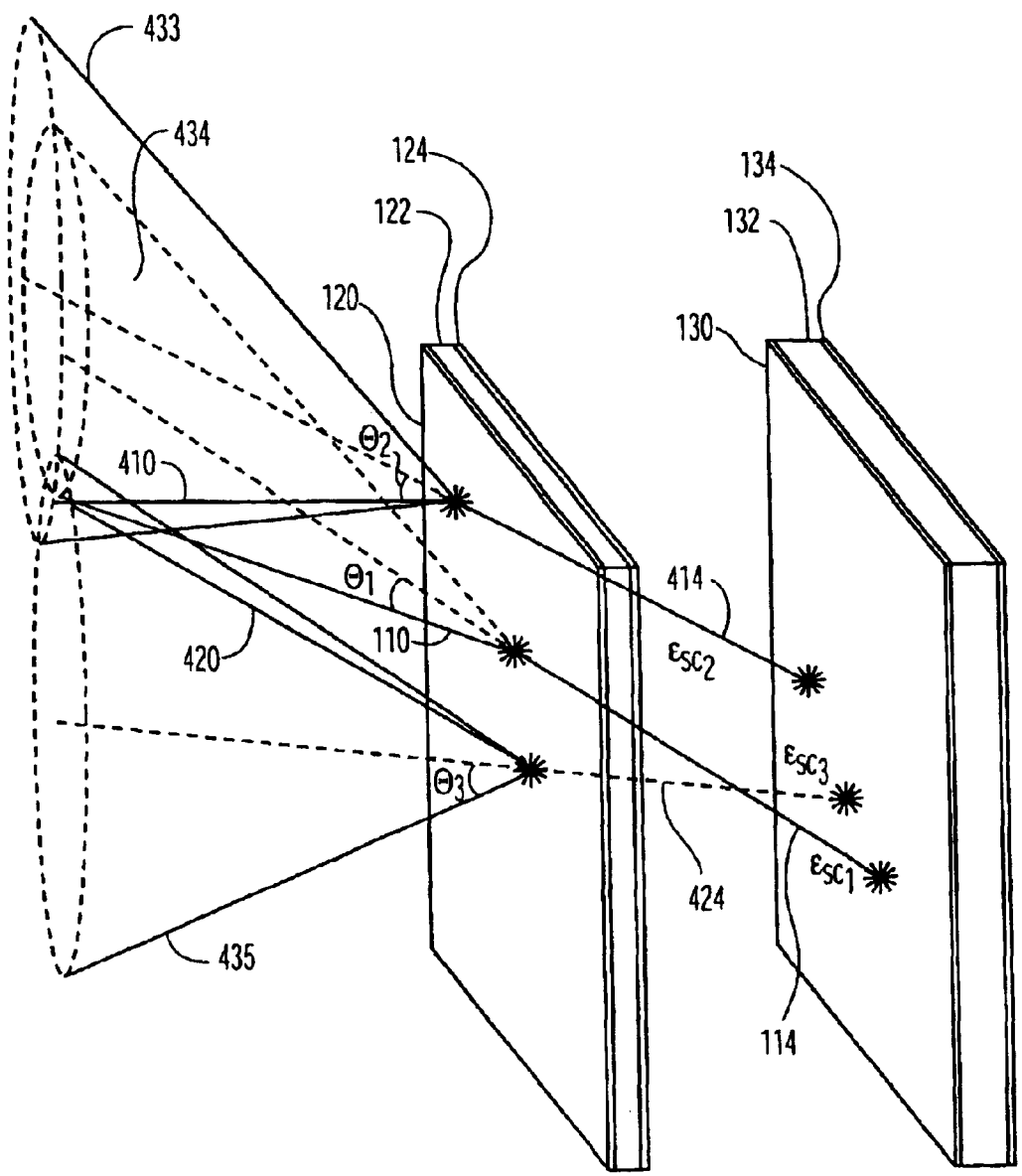
FIG. 4B illustrates multiple coincident events arising from the same point source of incident photons, whose cones-of-origin can be deconvolved to the original point source.

Knowing the Compton scattering angle determines a cone of origin of the incident photon $\gamma_0$, as shown in FIG. 4A. Once a collection of coincident events has been accumulated, a deconvolution is applied to derive the probable source position on each cone of origin for each incident photon $\gamma_0$, as shown in FIG. 4B. FIG. 4B illustrates multiple coincident events arising from the same point source of incident photons, traveling along incident paths 110, 410 and 420, whose cones of origin 433, 434 and 435 can be deconvolved to the original point source. The paths 114, 414 and 424 of the scattered photons are also shown.

Figure 4C:
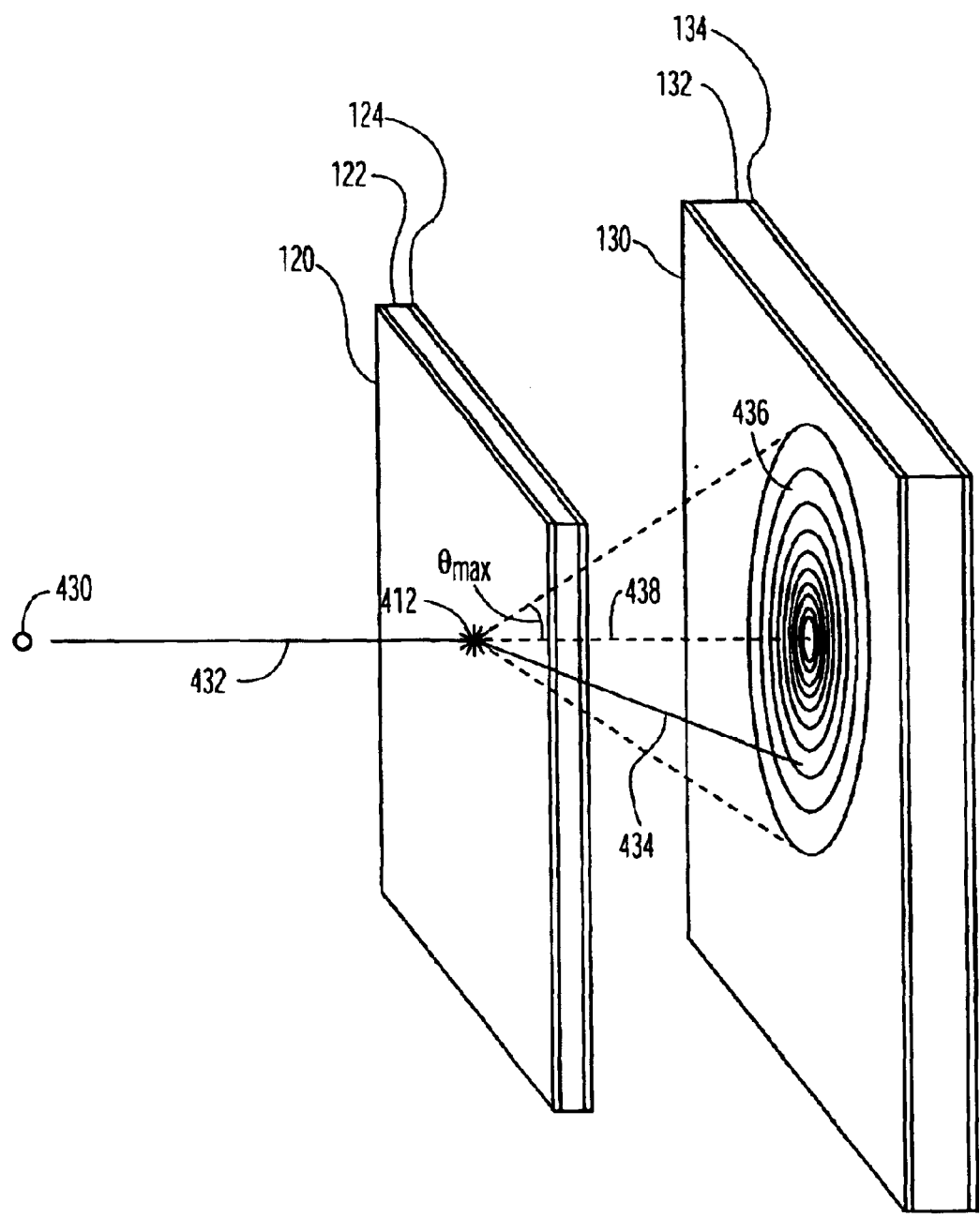
FIG. 4C illustrates the probability distribution of absorption events in the second detection layer resulting from incident photons from a point source undergoing Compton scattering at one location in the first detection layer.
Figure 4D:
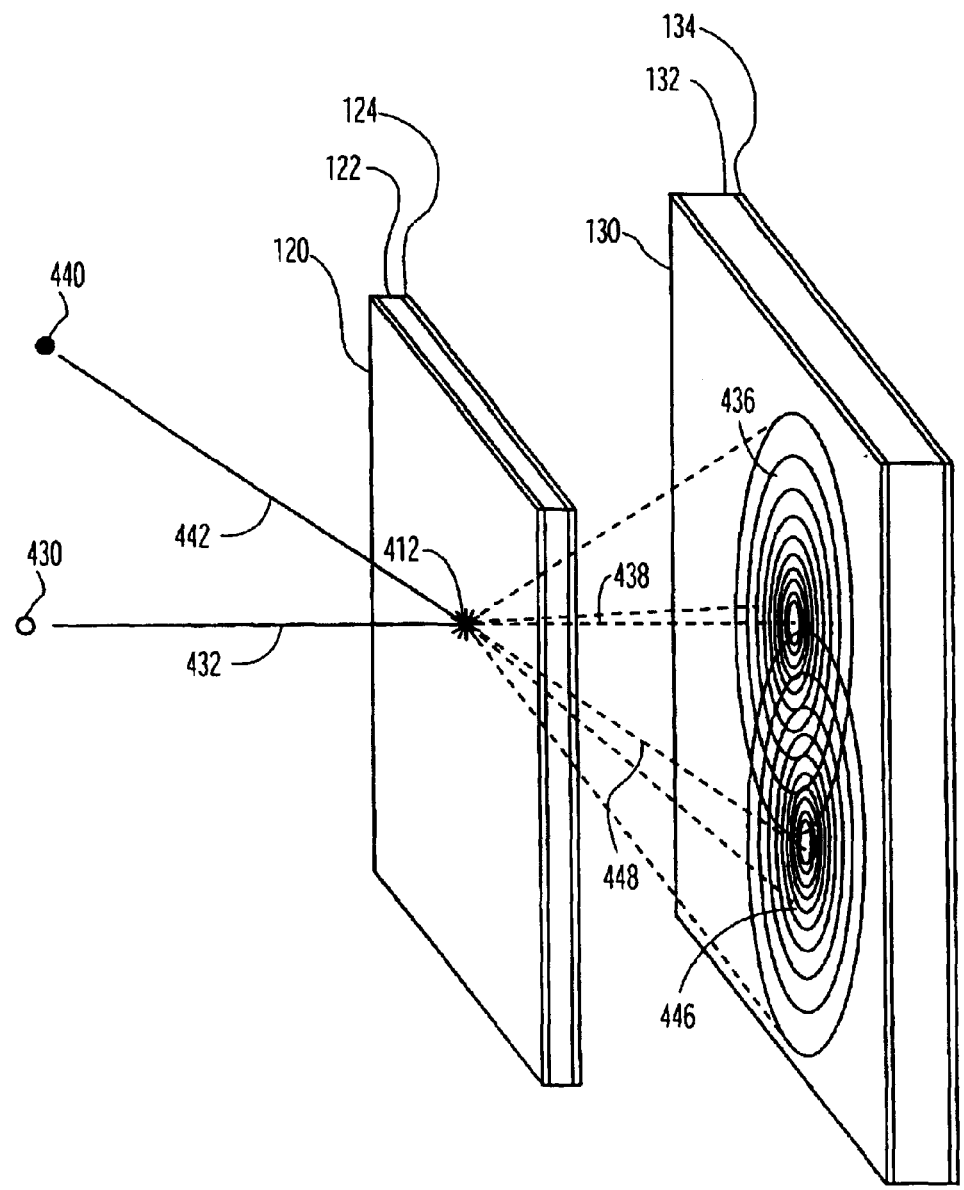
FIG. 4D illustrates the combined probability distribution of absorption events in the second detection layer resulting from incident photons from two point sources undergoing Compton scattering at the same location in the first detection layer.
Figure 4E:
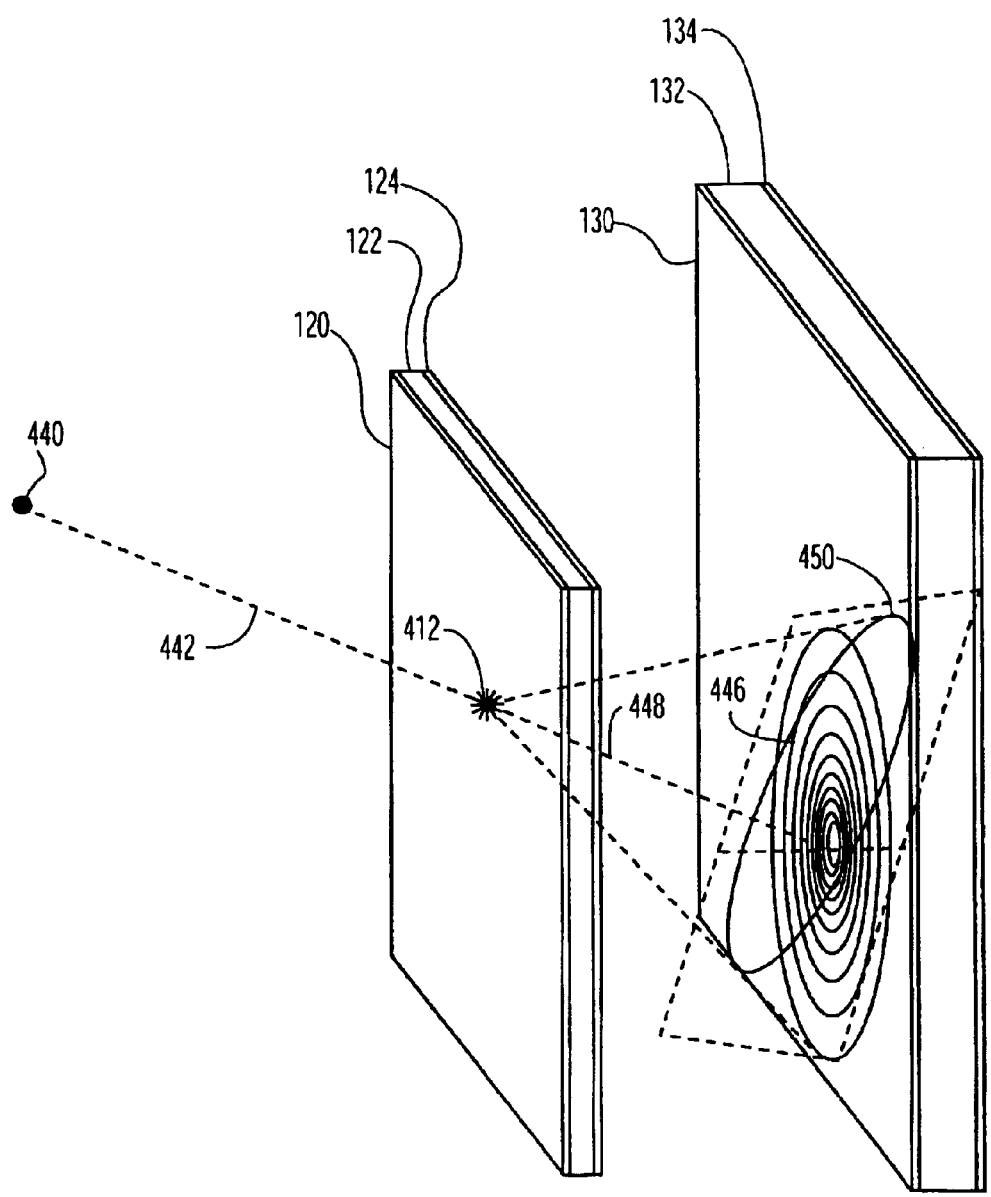
FIG. 4E illustrates the skewed probability distribution of absorption events in the second detection layer for photons incident at a non-perpendicular angle on the first detection layer, and the reconstruction of an unskewed distribution in a virtual plane perpendicular to the trajectory of the incident photons.

The distribution of Compton scattered photons from a particular point in space can be described as the sum of a set of annula (rings) centered at the intersection of the second detection plane with the vector originating at the scattering point and continuing along the direction of the incoming photon, as shown in FIGS. 4C–4E. FIG. 4C illustrates the probability distribution of absorption events in the second detection layer resulting from incident photons traveling along incident path 432 from a point source 430 and undergoing Compton scattering at one location 412 in the first detection layer. Shown in FIG. 4C are the central axis 438 of the forward-projected scattering cone from source 430 through location 412, the path 434 of the Compton-scattered photon, and the forward-projected Compton scattering pattern 436 from source 430 through location 412.

FIG. 4D illustrates the combined probability distribution of absorption events in the second detection layer resulting from incident photons traveling along incident paths 432, 434 from two point sources 430 and 440 undergoing Compton scattering at the same location 412 in the first detection layer. As shown, for the second point source 440 there is a second forward-projected Compton scattering pattern 446, defined around central axis 448 from point source 440 through location 412.

FIG. 4E illustrates a skewed probability distribution of absorption events in the second detection layer for photons incident at a non-perpendicular angle on the first detection layer, and the reconstruction of an unskewed distribution 450 in a virtual plane perpendicular to the trajectory of the incident photons (i.e., orthogonal to axis 448).

The Compton scattering angle $\theta$ is a well-known function of incoming (incident) photon energy versus outgoing (scattered) photon energy (based on conservation of momentum and energy). The distribution of scattering angles as a function of energy of incident photons $\gamma_0$ is described by the Klein-Nishina equation, which yields the differential scattering cross-section $d\sigma/d\Omega$, given by equation (4), where $\alpha=h\nu/m_0c^2$, and $r_0$ is the classical electron radius.

$$\frac{d\sigma}{d\Omega} = \quad (4)$$

$$r_0^2\left[\frac{1}{1+\alpha(1-\cos\theta)}\right]^3\left[\frac{1+\cos^2\theta}{2}\right]\left[1+\frac{\alpha^2(1-\cos\theta)^2}{(1+\cos^2\theta)[1+\alpha(1-\cos\theta)]}\right]$$

Figure 6A:
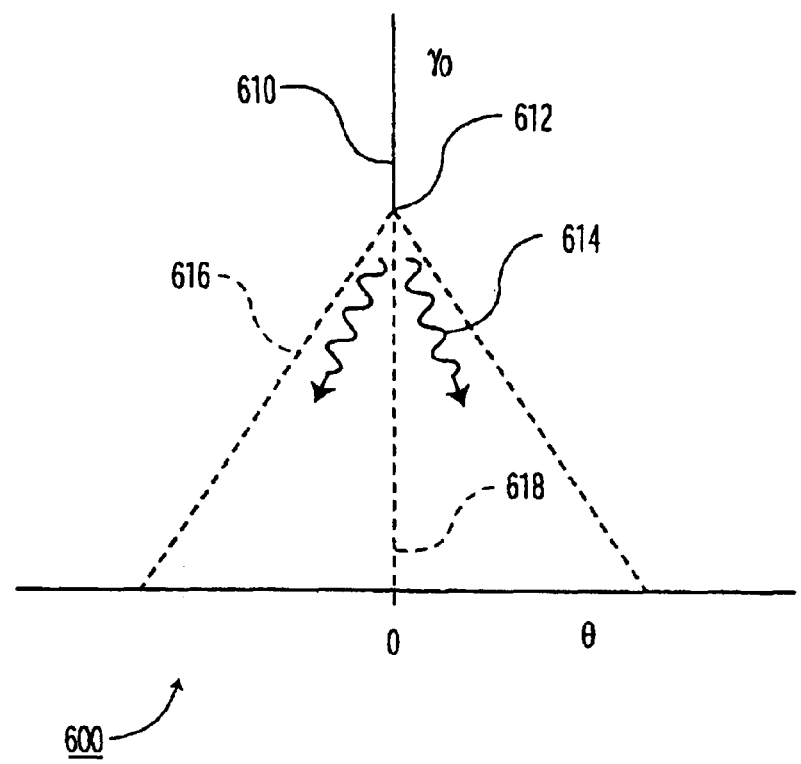
FIG. 6A illustrates Compton scattering of incident photons within a range of angles about the original angle of incidence.
Figure 6B:
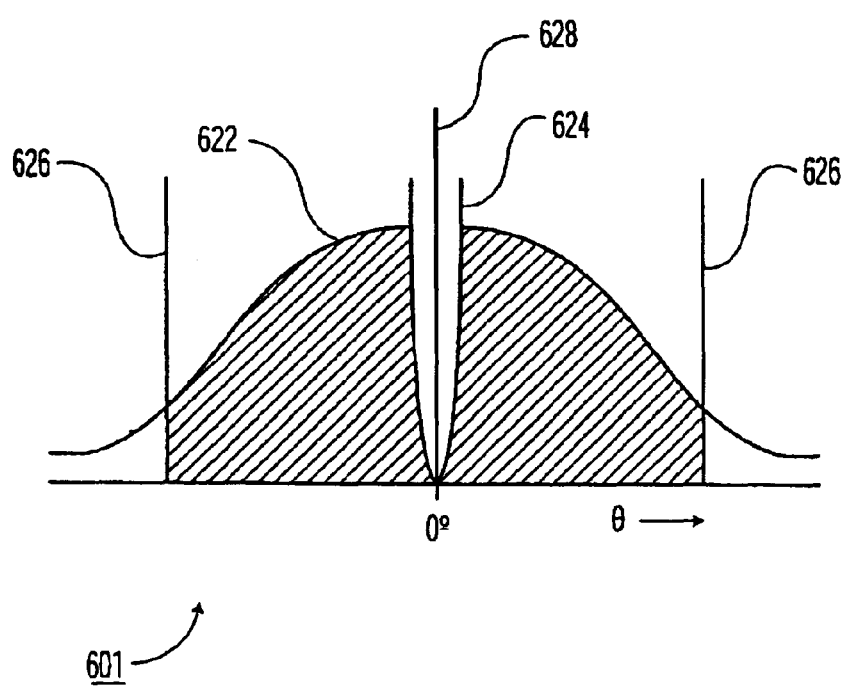
FIG. 6B illustrates an angular probability distribution of detected Compton-scattered photons, in which failure to detect incident photons that do not scatter results in a hole around 0 degrees.

The expected distribution of scattered photons with the same origin, direction, and incident energy is, therefore, the set of annula with a radial intensity distribution following the Klein-Nishina equation. The measured distribution can, therefore, be described as the convolution of the incoming intensity vector and a convolution kernel (the scattering kernel), as shown in FIGS. 6A and 6B. FIG. 6A illustrates photons along path 610 undergoing Compton scattering in the first detection layer, resulting in scattered photons 614 within a range of angles about the original path of incidence 610. The forward-projected Compton scattering cone 616 is defined about central axis 618 from the point 612 of Compton scattering in the first detection layer.

FIG. 6B illustrates a graphical representation 601 of an angular probability distribution of detected Compton-scattered photons, in which failure to detect unscattered incident photons or very low angle Compton events (where energy absorbed is too small) results in a "hole" around 0 degrees from the path of incidence 628. The "hole" 624 represents an exclusion zone for incident gamma ray photons which did not interact in the first detection layer. Curve 622 represents the probability of Compton-scattered gamma ray photons absorbed in the second detection layer. Confidence limits 626 are optional.

Figure 6C:
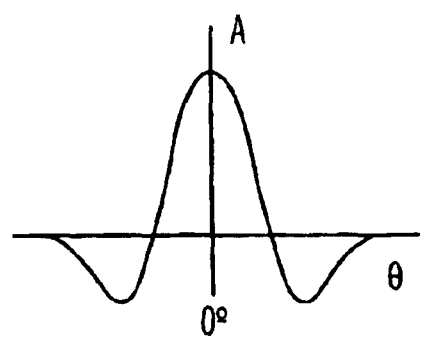
FIGS. 6C, 6D and 6E illustrate, respectively, the inverse deconvolution kernel, deconvolution kernel, and resulting delta function defining the probable angular origin of incident photons.
Figure 6D:
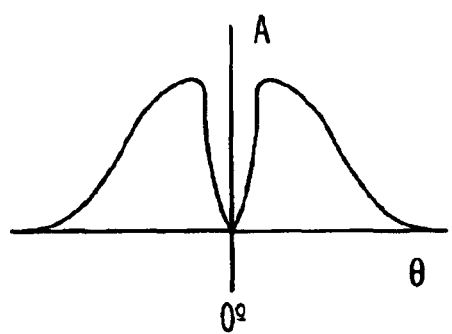
Figure 6E:
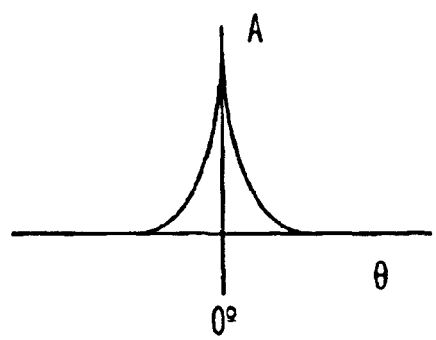

Deconvolution is a well-known mathematical method applicable to linear distributions. Consider a one-dimensional example of deconvolution in image processing, in which an input representing a single point along the axes is "scattered" according to a Gaussian distribution. To determine the location of the original point, one would replace each value on the line by the sum of each point along the measurement line with the "inverse" of the Gaussian distribution. The inverse can be computed or approximated by taking the Fourier transform of the original "scattering" distribution, performing multiplicative inversion ($x^{-1}$), and then taking the inverse Fourier transform, as shown in FIGS. 6C through 6E. FIGS. 6C, 6D and 6E illustrate, respectively, the inverse deconvolution kernel, the deconvolution kernel, and the resulting delta function defining the probable angular origin of incident photons.

Another example of a one-dimensional deconvolution is the first step in the image reconstruction process employed in transmission computed tomography (CT) and emission computed tomography (ECT) imaging. Each one-dimensional projection is deconvolved (although it is sometimes referred to as "convolution") prior to being back-projected. The back-projection process itself creates the equivalent of a convolution of the original projections. Pre-emptive deconvolution allows back-projection to result in a correct image.

In this particular case, the distribution function is the Compton scattering kernel. The Compton scattering kernel is a set of values (for a given input spectrum) that has traditionally been computed using Monte Carlo methods. This kernel has been used in the forward direction for computing expected radiation dose distribution given a specified radiation field, as described by T. R. Mackie et al., "Tomotherapy: a new concept for the delivery of dynamic conformal radiotherapy", *Med. Phys.* 20(6) pp. 1709–19 (1993). The inverse of the Compton scattering kernel has been used for deconvolution for particular methods of optimizing the specification of radiation fields given a desired radiation dose distribution, as described by T. Holmes et al., "A unified approach to the optimization of brachytherapy and external beam dosimetry", *Int. J. Radiation Oncology Biol. Phys.* 20(4) pp. 859–873 (1991). The use of a scattering kernel which incorporates spectral information has also been described in the radiation therapy planning literature, and such a kernel is defined as a polyenergetic kernel by N. Papanikolaou et al. "Investigation of the convolution method for polyenergetic spectra", *Med. Phys.* 20(5) pp. 1327–36 (1993). Applying a polyenergetic kernel for deconvolution takes into account the probable energy distribution of detected events, and allows the CDC technique to require less energy specificity than other Compton imaging methods.

The Compton deconvolution camera can be treated as a two-step aperture. The general formula relating an object and image through an aperture is given by equation (5).

$$h(r'') = f(r) ** g(r') \tag{5}$$

In equation (5), f(r) is the source of the emitted photons, g(r') is the aperture point spread function, h(r'') is the detected image, and each r is the position of an incident or scattered photon relative to the line from a source to a given pixel in the first detector plane. In the Compton deconvolution camera, the first detector plane acts as two apertures.

First aperture: By utilizing coincidence (timing) electronics, the Compton deconvolution camera acts like a set of independent pinhole collimators in that the second detector plane can be treated as a set of virtual image detection planes, one per pixel of the first detector plane. A pinhole collimator has an idealized point spread function $g(r') = \delta(r - r_0)$.

Second aperture: Once the first pixel has detected an incident photon, the medium of the first detector plane in that pixel acts as an aperture onto the virtual second detector plane with a point spread function defined by the Klein-Nishina equation and the likelihood of a priori detection in the first pixel. In practical terms, the exact form of the distribution in the second detector plane will depend strongly on the energy of the incident photons, the construction of the first detector plane (photon stopping power determined by atomic composition and thickness), the separation between the two detector planes, and the sensitivity of the second detector plane.

In addition to the point spread function due to Compton scattering, there is also a spatially variant component due to the geometry of the second detector being planar instead of a spherical surface centered at the first pixel in the first detector layer. This distortion is purely geometric and can be undone (compensated to recover the original geometry of the point spread function in a plane orthogonal to the axis of Compton scattering) by applying an inverse distortion on the data. The inversion is a reverse look-up of $D(\theta, \psi)$, as set forth in equation (6).

$$D(\theta, \psi) = \tan^{-1}\left(\frac{\sum_i^n w_i \tan(\theta_i + \psi)}{\sum_i^n w_i}\right) \tag{6}$$

In equation (6), $w_i$ is the scattering kernel from the Klein-Nishina equation, i represents each measured pixel (position) in the second detector plane, $\psi$ is the angle of incidence relative to the perpendicular to the two detector planes, and $\theta_i$ defines the angle between the axis joining the coincidence pixels in the first and second detector layers and the axis of incidence. The geometric distortion function can be visually identified to be slowly varying monotonic up to the limits of the detection acceptance angle (<80°, but would preferably be further limited to reduce background scattering) for a feasible detection geometry.

The inverse distortion operation must be applied before deconvolution of the image (recovery of the original point spread function) on the second detector plane. Recovery from Compton scattering (for straight forward orthogonal incidence to an aperture) requires deconvolution in finite terms. A distribution function $f(r_i)$ may be blurred by an aperture function $g(r_i')$, resulting in a detected distribution $h(r_i'')$ as set forth in equation (7).

$$h(r'') = \sum_i f(r_i) g(r_i' - r_i) \tag{7}$$

Recovery of the original signal $f(r)$ from the detected signal $h(r'')$ is performed according to equation (8), where $G^{-1}$ is the deconvolution kernel.

$$f(r) = \sum_i h(r_i'') \tilde{G}^{-1}(r_i - r_i') \tag{8}$$

For a linear, shift-invariant aperture $g(r')$, $G^{-1}$ is given by equation (9), where the Fourier transform of $g(r')$ is given by equation (10).

$$G^{-1} = 1/G \tag{9}$$

$$G = \frac{1}{\sqrt{2\pi}} \int g(r) e^{ikr} dr \tag{10}$$

Then the inverse Fourier transform of the restoration operation $G^{-1}$ is given by equation (11).

$$\tilde{G}^{-1} = \frac{1}{\sqrt{2\pi}} \int \frac{e^{-ikr}}{G} dr \tag{11}$$

The coincidence Compton scattering kernel can be very roughly approximated for demonstration purposes to be $g(r')$ as set forth in equation (12), where $\sigma$ is the variance of Compton scattering angles.

$$g(r') = |r'| e^{-r'^2/2\sigma^2} \tag{12}$$

This is a Gaussian distribution with a hole in the center (FIG. 6D) due to failure to register a coincidence event when the energy deposited by the incident photon in the first detector layer is below the threshold of detection (includes the case of no Compton scattering at all).

Given C, the contraction operation, $g(r')$, the scattering kernel, and $h(r''_i)$, the detected signal (FIG. 6C), for pixel i in the first detector plane, the recovered sinogram (projection) image $f(r)$ (FIG. 6E) on the virtual detector plane is as given in equation (13).

$$f(r) = C\left(h(r_i'') ** \tilde{G}^{-1}\right) \tag{13}$$

This sinogram image is then used to determine what values to accumulate in the single-photon emission computed tomography (SPECT) sinogram space (a set of planar sinograms).

The detection geometry defines the relationship. For a detector at some nominal angle with respect to the vertical (e.g., the gantry angle), the incoming angle of the detected photon streams is calculated from the relative positions of the first pixel in the first detector plane for each recovered sinogram (projection) pixel in the second detector plane. The angular offset $\psi$ is the equivalent rotation of the detector heads for sinogram construction. From this, the offset x from the center of an equivalent parallel collimator camera can be computed.

Figure 6F:
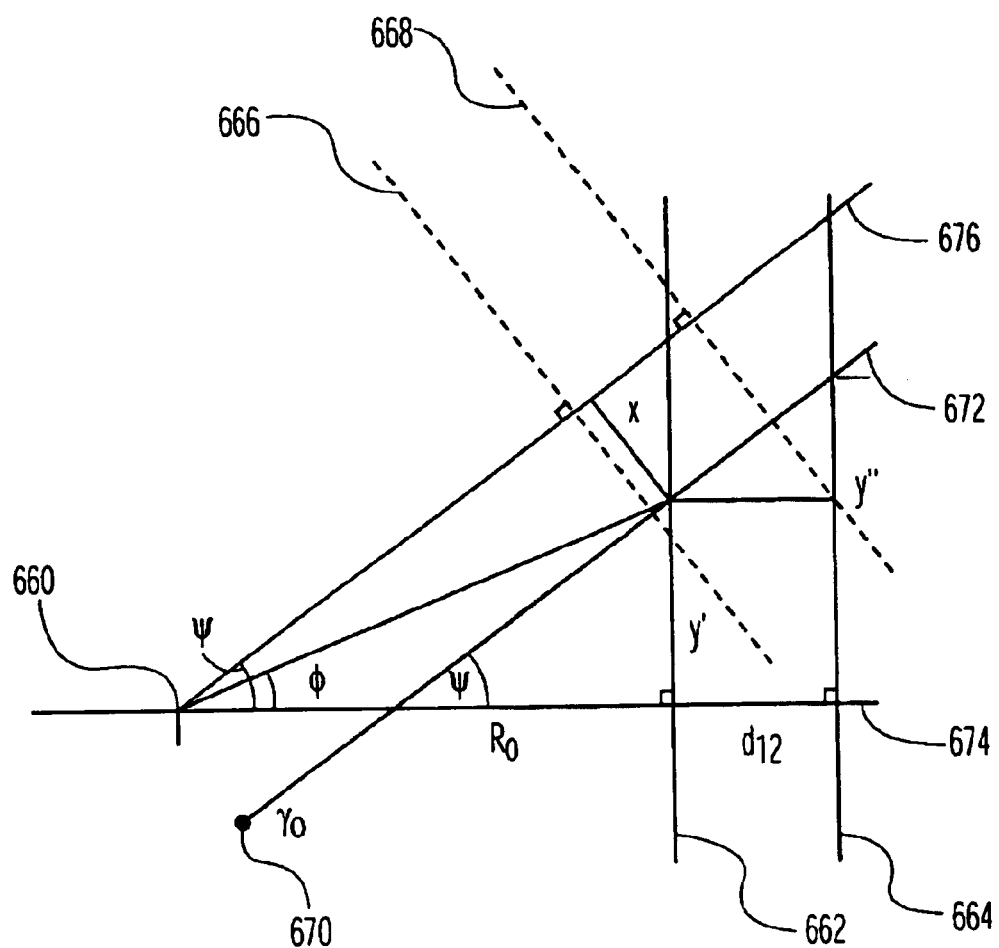
FIG. 6F illustrates the calculation of angle and offset values for photon incidence at oblique angles on detector planes rotating about an isocenter.

FIG. 6F illustrates the first and second detector layers (662 and 664) rotatable about an isocenter 660. A point radiation source 670 emits a $\gamma_0$ photon incident along path 672. This photon is detected in the first detector layer at a displacement y' relative to the detector radius vector 674. The axis of incidence intersects the second detector layer at a displacement y". The first and second detector layers (666 and 668) are shown in a second position with radius vector 676, chosen for rebinning purposes to be perpendicular to this incident path (for the purpose of equivalent parallel collimation). In this second detector position, the same incident $\gamma_0$ photon would be detected in both detector planes at a new displacement x.

The angle $\psi$ and offset x values for these parallel collimator equivalents in two dimensions are set forth in equations (14) and (15), respectively.

$$\psi = \tan^{-1}\left(\frac{y'' - y'}{d_{12}}\right) \tag{14}$$

$$x = \sqrt{y'^2 + R_0^2} \sin\left(\psi - \tan^{-1}\frac{y'}{R_0}\right) \tag{15}$$

In the above equations, $d_{12}$ is the separation between the two detector layers; $R_0$ is the radius from the isocenter to the first detector layer; $\psi$ is the angle of incidence relative to the detector radius vector; $\phi$ is the angular displacement of the pixel in the first detector layer relative to the detector radius vector when it is in the first position; and equation (16) defines the relationship between y', $R_0$ and $\phi$.

$$\tan^{-1}\frac{y'}{R_0} = \phi \tag{16}$$

The sets of projections can be separated (or associated) by angle of incidence of the incoming photons (rebinned). The incoming photon angles will already have been estimated and tabulated as a result of the deconvolution of the measured scattered radiation field by the Compton kernel. While a (physically) collimated SPECT camera is restricted to measuring a single set of projections for a given position of the detector(s), the CDC simultaneously measures multiple projection sets.

Having rebinned all of the data into a set of sinograms (projections) corresponding to a parallel collimated SPECT scanner, the image is reconstructed using a standard SPECT image reconstruction algorithm. Judicious choice of binning geometry also allows for use of Fourier reconstruction techniques.

The volumetric placement of counts provides a three-dimensional reconstruction that can be used for planar projection displays, or may be used in combination with rotational SPECT to provide a more accurate three-dimensional dataset. Because the incident photons $\gamma_0$ are arriving from different directions, even planar image reconstruction requires estimation of depth of origin. This is also accomplished by three-dimensional reconstruction based on all vectors within the field-of-view defined by the acceptance angle.

Because the two-dimensional angle of origin of each the incident photon $\gamma_0$ is known, coincident counts can be selectively accepted according to angle of origin to generate collimated, steered, focused, and sector images. This provides substantial flexibility in image reconstruction and reprocessing in software post-processing.

FIG. 8 illustrates the overall process of performing event detection and image reconstruction using the CDC, according to one embodiment. Ionization (or scintillation) events are detected in the first and second detection layers at blocks 810 and 820, respectively. The detected events are preamplified and A/D converted for the first and second detection layers at blocks 812 and 822, respectively. At blocks 814 and 824, the two-dimensional positions (in the plane of the detection layer) of the events are determined in the first and second layers, respectively, using two-dimensional position interpolation.

Next, at block 830 a determination is made of whether there are two or more events in coincidence. If not, the process loops back to blocks 810 and 820. If there are exactly two events in coincidence, the process continues from blocks 816 and 826, in which the energy $\epsilon_{re}$ of the recoil electron for the event in the first and second layer, respectively, is estimated, using spatial integration of pulse height. If there were more than two events found to be in coincidence at block 830, then the process continues from blocks 816 and 826 only if a determination in block 832 indicates that there were exactly two events found in coincidence in a single zone. Otherwise, the process loops back to blocks 810 and 820.

After estimation of the recoil electron energies $\epsilon_{re}$, the estimated energy values $\epsilon_{re}$ are applied to a gating function at block 834 to validate that the two coincident events are in fact related to the same incident gamma photon. If the validation fails, the process loops back to blocks 810 and 820. If the energy values are validated, then at block 836 a determination is made of whether the energy $\epsilon_o$ of the incident photon equals the sum of the energy $\epsilon_{re}$ of the recoil electron and the energy $\epsilon_{sc}$ of the scattered photon. If such equality is found, the process continues from block 838. Otherwise, the process loops back to blocks 810 and 820.

At block 838, an appropriate number of counts is stored for the detected coincident event in each detection layer in the proper location (pixel) of memory for each layer. Next, at block 840 the Compton scattering angle is computed from the energy $\epsilon_{sc}$ of the scattered photon in the second detection layer. If sufficient counts accumulated according to a predefined count threshold or acquisition time limit at block 842, then the process continues from block 844. Otherwise, the process loops back to blocks 810 and 820. At block 844, the cones of origin are deconvolved into probable source locations for the incident photons. If collimation is selected at block 846, then any skewed vectors are eliminated at block 850, and a two-dimensional planar image is displayed at 852. If collimation is not selected, then a tomographic three-dimensional image is reconstructed at 854, and two-dimensional "slice" images or volume projections are displayed at 856.

Thus, a method and apparatus for generating images in a medical imaging system based on detected radiation by using Compton scattering principles have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A Compton deconvolution camera comprising:
    a first detection layer and a second detection layer, each to detect events resulting from incident photons;
    position sensing logic to determine positions of events in each of the first and second detection layers;
    a coincidence detector to detect pairs of coincident events resulting from Compton scattering; and
    processing logic to:
        for each of a plurality of subsets of the first detection layer, associate data representing events detected for said subset with a distribution of corresponding events in the second detection layer, based on said detected pairs of coincident events,
        use a deconvolution function to localize probable source locations of incident photons based on said distributions of corresponding events, and
        use said probable source locations to reconstruct an image of an object.

2. A Compton deconvolution camera as recited in claim 1, wherein said deconvolution is performed on the distribution of events in the second detection layer for each said subset of the first detection layer.

3. A Compton deconvolution camera as recited in claim 2, wherein the processing logic performs said association of data by computing Compton scattering angles for the detected pairs of coincident events.

4. A Compton deconvolution camera as recited in claim 1, wherein the first detection layer is disposed to receive the incident photons.

5. A Compton deconvolution camera as recited in claim 4, wherein the image is acquired using a single-photon emission mode.

6. A Compton deconvolution camera as recited in claim 4, wherein the processing logic is configured to collimate the incident photons.

7. A Compton deconvolution camera as recited in claim 1, wherein each of the detection layers comprises an array of solid-state ionization detectors.

8. A Compton deconvolution camera as recited in claim 1, wherein each of the detection layers comprises a scintillator and an array of solid-state photodetectors.

9. A Compton deconvolution camera as recited in claim 1, wherein one of the detection layers comprises an array of solid-state ionization detectors; and another of the detection layers comprises a scintillator and an array of solid-state photodetectors.

10. A Compton deconvolution camera as recited in claim 1, wherein one of the detection layers comprises an array of solid-state ionization detectors; and another of the detection layers comprises a scintillator and an array of photomultiplier tubes.

11. A Compton deconvolution camera as recited in claim 1, wherein one of the detection layers comprises a scintillator and an array of solid-state photodetectors; and another of the detection layers comprises a scintillator and an array of photomultiplier tubes.

12. A Compton deconvolution camera as recited in claim 1, wherein the processing logic is configured to use measured values of absorbed energy in the detected events to reject photons subjected to multiple Compton scattering.

13. A Compton deconvolution camera as recited in claim 1, wherein the processing logic is configured to use measured values of absorbed energy in the detected events to validate the computed Compton scattering angles.

14. A nuclear medicine imaging system comprising:
    a plurality of detector heads, each of the detector heads including two substantially parallel detection layers to detect events resulting from incident gamma rays originating from an object containing a radiopharmaceutical agent;

position sensing logic to determine positions of events in each of the detection layers;

a coincidence detector to detect pairs of coincident events resulting from Compton scattering, each pair including one event in each detection layer; and processing logic to:

for each of a plurality of subsets of one of the detection layers, forward project data representing detected events into a distribution of associated events in the other detection layer, based on said detected pairs, apply a deconvolution function to the forward-projected data to localize probable source locations of incident gamma rays, and use said probable source locations to reconstruct an image of the object.

15. A nuclear medicine imaging system as recited in claim 14, wherein the incident photons are electronically collimated.

16. A nuclear medicine imaging system as recited in claim 15, wherein the image is acquired using a single-photon emission mode.

17. A nuclear medicine imaging system as recited in claim 15, wherein the processing logic is configured to collimate the incident gamma rays.

18. A nuclear medicine imaging system as recited in claim 14, wherein each of the detection layers in each of the detector heads comprises an array of solid-state ionization detectors.

19. A nuclear medicine imaging system as recited in claim 14, wherein each of the detection layers in each of the detector heads comprises a scintillator and an array of solid-state photodetectors.

20. A nuclear medicine imaging system as recited in claim 14, wherein:

one of the detection layers in each of the detector heads comprises an array of solid-state ionization detectors; and the other of the detection layers in each of the detector heads comprises a scintillator and an array of photodetectors.

21. A nuclear medicine imaging system as recited in claim 14, wherein the processing logic is configured to use measured values of absorbed energy in the detected events to reject photons subjected to multiple Compton scattering.

22. A nuclear medicine imaging system as recited in claim 14, wherein the processing logic is configured to use measured values of absorbed energy in the detected events to validate computed Compton scattering angles.

23. A gamma camera comprising:

a plurality of detection layers, each to detect events resulting from incident photons;

positioning means for determining positions of events in each of the detection layers;

coincidence means for detecting pairs of coincident events resulting from Compton scattering; and forward-projection means for forward-projecting data representing detected events, for each of a plurality of subsets of one of the detection layers, into a distribution of corresponding events in the other detection layer, based on said detected pairs of coincident events, deconvolution means for applying a deconvolution function to the forward-projected data to localize probable source locations of incident photons, and reconstruction means for using said probable source locations to reconstruct an image of an object.

24. A gamma camera as recited in claim 23, wherein the forward-projection means comprises means for forward projecting events in one of the detection layers corresponding to a coincident event at a given pixel in another one of the detection layers.

25. A gamma camera as recited in claim 24, wherein each of the detection layers each comprises an array of solid-state ionization detectors.

26. A gamma camera as recited in claim 24, wherein each of the detection layers each comprises a scintillator and an array of solid-state photodetectors.

27. A gamma camera as recited in claim 24, wherein one of the detection layers comprises an array of solid-state ionization detectors; and another of the detection layers comprises a scintillator and an array of solid-state photodetectors or photomultiplier tubes.

28. A gamma camera as recited in claim 24, further comprising means for using measured values of absorbed energy in the detected events to reject photons subjected to multiple Compton scattering.

29. A gamma camera as recited in claim 24, further comprising means for using measured values of absorbed energy in the detected events to validate the computed Compton scattering angles.

30. A gamma camera as recited in claim 23, wherein one of the detection layers is disposed to receive the incident photons.

31. A gamma camera as recited in claim 30, wherein a second one of the detection layers is disposed to receive photons that have undergone Compton scattering in the first detection layer.

32. A gamma camera as recited in claim 31, wherein the reconstruction means comprises means for reconstructing the image from a single-photon emission mode.

33. A gamma camera as recited in claim 32, further comprising means for collimating the incident photons without using a physical collimator.

34. A Compton deconvolution camera comprising:

a first detection layer to detect events resulting from incident photons, at least some of which undergo Compton scattering;

a second detection layer to detect events resulting from incident photons Compton-scattered in the first detection layer;

first position sensing logic to determine positions of events in the first detection layer, the first detection layer comprising a plurality of pixels;

second position sensing logic to determine positions of events in the second detection layer;

a coincidence detector to detect pairs of coincident events, each pair including an event in the first detection layer and an event in the second detection layer; and processing logic to for each pixel of the first detection layer, forward-project data representing the detected events into a positional distribution of events in the second detection layer, apply a deconvolution function to the forward-projected data to localize probable source locations of incident photons, and use said probable source locations to reconstruct an image of an object.

35. A Compton deconvolution camera as recited in claim 34, wherein the deconvolution function is applied to the collective forward-projected data for all pixels of the first detection layer.

36. A Compton deconvolution camera as recited in claim 35, wherein the incident photons are electronically collimated.

37. A Compton deconvolution camera as recited in claim 36, wherein detection of said events is performed using a single-photon emission mode.

38. A Compton deconvolution camera as recited in claim 36, wherein the processing logic is configured to collimate the incident photons.

39. A Compton deconvolution camera as recited in claim 34, wherein the first and second detection layers each comprise an array of solid-state ionization detectors.

40. A Compton deconvolution camera as recited in claim 34, wherein the first and second detection layers each comprise a scintillator and an array of solid-state photodetectors.

41. A Compton deconvolution camera as recited in claim 34, wherein:
one of the first and second detection layers comprises an array of solid-state ionization detectors; and
the other of the first and second detection layers comprises a scintillator and an array of solid-state photodetectors.

42. A Compton deconvolution camera as recited in claim 34, further comprising:
a first pulse height analyzer to measure the energy of events detected in the first detection layer; and
a second pulse height analyzer to measure the energy of events detected in the second detection layer.

43. A Compton deconvolution camera as recited in claim 34, wherein the processing logic is configured to use measured values of absorbed energy in the detected events to reject photons subjected to multiple Compton scattering.

44. A Compton deconvolution camera as recited in claim 34, wherein the processing logic is configured to use measured values of absorbed energy in the detected events to validate computed Compton scattering angles.

45. A Compton deconvolution camera comprising:
a first detection layer to detect events resulting from incident photons from an object to be imaged, wherein at least some of the incident photons undergo Compton scattering in the first detection layer;
a second detection layer substantially parallel to the first detection layer, to detect events resulting from photons Compton-scattered in the first detection layer;
first position sensing logic to determine two-dimensional positions of events in the first detection layer;
second position sensing logic to determine two-dimensional positions of events in the second detection layer;
a coincidence detector to detect pairs of coincident events, each pair including an event in the first detection layer and an event in the second detection layer;
a first memory to store data representing a positional distribution of the events in the first detection layer belonging to said pairs of coincident events, wherein the first detection layer is represented as a plurality of two-dimensional locations,
a second memory; and
processing logic to compute the Compton scattering angles for the detected pairs of coincident events, accumulate in the second memory, for each said two-dimensional location of the first detection layer, a two-dimensional positional distribution of potentially corresponding coincident events in the second detection layer, apply a deconvolution function to the data in the second memory, for each said two-dimensional location of the first detection layer, to localize probable origins of the incident photons represented by said pairs of coincident events, and back project the processed data to reconstruct an image of the object.

46. A Compton deconvolution camera as recited in claim 45, wherein said incident photons from the object are electronically collimated.

47. A Compton deconvolution camera as recited in claim 46, wherein the image is acquired using a single-photon emission mode.

48. A Compton deconvolution camera as recited in claim 47, wherein the processing logic is configured to collimate the incident photons.

49. A Compton deconvolution camera as recited in claim 45, wherein the first and second detection layers each comprise an array of solid-state ionization detectors.

50. A Compton deconvolution camera as recited in claim 45, wherein the first and second detection layers each comprise a scintillator and an array of solid-state photodetectors.

51. A Compton deconvolution camera as recited in claim 45, wherein:
one of the first and second detection layers comprises an array of solid-state ionization detectors; and
the other of the first and second detection layers comprises a scintillator and an array of photodetectors.

52. A Compton deconvolution camera as recited in claim 45, further comprising:
a first pulse height analyzer to measure the energy of events detected in the first detection layer; and
a second pulse height analyzer to measure the energy of events detected in the second detection layer.

53. A Compton deconvolution camera as recited in claim 45, wherein the processing logic is configured to use measured values of absorbed energy in the detected events to reject photons subjected to multiple Compton scattering.

54. A Compton deconvolution camera as recited in claim 45, wherein the processing logic is configured to use measured values of absorbed energy in the detected events to validate the computed Compton scattering angles.

55. A Compton deconvolution camera comprising:
a first detection layer to detect events resulting from incident photons from an object to be imaged, wherein at least some of the incident photons undergo Compton scattering in the first detection layer;
a second detection layer substantially parallel to the first detection layer, to detect events resulting from photons Compton-scattered in the first detection layer;
a first set of amplifiers to amplify outputs of the first detection layer;
a second set of amplifiers to amplify outputs of the second detection layer;
a first set of analog-to-digital (A/D) converters to digitize the amplified outputs of the first set of preamplifiers;
a second set of analog-to-digital (A/D) converters to digitize the amplified outputs of the second set of preamplifiers;
first position sensing logic coupled to receive the digitized, amplified outputs of the first detection layer, to determine two-dimensional positions of events in the first detection layer;
second position sensing logic coupled to receive the digitized, amplified outputs of the second detection layer, to determine two-dimensional positions of events in the second detection layer;

a coincidence detector to detect pairs of coincident events, each pair including an event in the first detection layer and an event in the second detection layer;

a first pulse height analyzer to measure the energy of events detected in the first detection layer;

a second pulse height analyzer to measure the energy of events detected in the second detection layer;

a first memory to store data representing a two-dimensional positional distribution of the events in the first detection layer belonging to said pairs of coincident events, wherein the first detection layer is represented as a plurality of pixels, a second memory; and processing logic to accumulate in the second memory, for each pixel of the first detection layer, a two-dimensional positional distribution of potentially corresponding coincident events in the second detection layer, process the data in the second memory by applying a deconvolution function, for all pixels of the first detection layer, to localize probable origins of the incident photons represented by the pairs of coincident events, compute the Compton scattering angles for the detected pairs of coincident events, and back project the processed data to reconstruct an image of the object.

56. A Compton deconvolution camera as recited in claim 55, wherein said incident photons from the object are electronically collimated.

57. A Compton deconvolution camera as recited in claim 56, wherein the image is acquired using a single-photon emission mode.

58. A Compton deconvolution camera as recited in claim 56, wherein the processing logic is configured to collimate the incident photons.

59. A Compton deconvolution camera as recited in claim 55, wherein the first and second detection layers each comprise an array of solid-state ionization detectors.

60. A Compton deconvolution camera as recited in claim 55, wherein the first and second detection layers each comprise a scintillator and an array of solid-state photodetectors.

61. A Compton deconvolution camera as recited in claim 55, wherein:

one of the first and second detection layers comprises an array of solid-state ionization detectors; and the other of the first and second detection layers comprises a scintillator and an array of photodetectors.

62. A Compton deconvolution camera as recited in claim 55, wherein the processing logic is configured to use measured values of absorbed energy in the detected events to reject photons subjected to multiple Compton scattering.

63. A Compton deconvolution camera as recited in claim 55, wherein the processing logic is configured to use measured values of absorbed energy in the detected events to validate the computed Compton scattering angles.

64. A method of generating an image of an object, the method comprising:

using a plurality of substantially parallel detection layers to detect events resulting from incident photons, without using a physical collimator;

determining positions of the events in each of the detection layers;

identifying pairs of said events occurring in coincidence, said pairs resulting from Compton scattering, each said pair including one event from each of the detection layers;

forward-projecting data representing detected events, for each of a plurality of subsets of one of the detection layers, into a distribution of corresponding events in the other detection layer, based on said detected pairs of coincident events;

using a deconvolution function to localize probable source locations of incident photons; and using the probable source locations to reconstruct an image of an object.

65. A method as recited in claim 64, wherein said using a plurality of substantially parallel detection layers to detect events comprises detecting events in a single-photon mode.

66. A method as recited in claim 64, further comprising electronically collimating the incident photons.

67. A method as recited in claim 64, wherein said forward-projecting comprises forward-projecting a pattern of scintillation events in the second detection layer corresponding to coincident events at a given pixel in the first detection layer.

68. A method as recited in claim 64, wherein each of the detection layers each comprises an array of solid-state ionization detectors.

69. A method as recited in claim 64, wherein each of the detection layers each comprises a scintillator and an array of solid-state photodetectors.

70. A method as recited in claim 64, wherein one of the detection layers comprises an array of solid-state ionization detectors, and another of the detection layers comprises a scintillator and: an array of solid-state photodetectors or photomultipliers.

71. A method as recited in claim 64, further comprising using measured values of absorbed energy in the detected events to reject photons subjected to multiple Compton scattering.

72. A method as recited in claim 64, further comprising using measured values of absorbed energy in the detected events to validate the computed Compton scattering angles.

* * * * *